United States Patent
Harwood et al.

(10) Patent No.: US 12,239,057 B2
(45) Date of Patent: Mar. 4, 2025

(54) SOILLESS GROWTH MEDIA FOR INDOOR AGRICULTURE

(71) Applicant: Just Greens, LLC, Newark, NJ (US)

(72) Inventors: Edward D. Harwood, Ithaca, NY (US); James Zeiba, Derry, NH (US)

(73) Assignee: New AeroFarms, Inc., Ringgold, VA (US)

( * ) Notice: Subject to any disclaimer, the term of this patent is extended or adjusted under 35 U.S.C. 154(b) by 866 days.

(21) Appl. No.: 17/297,709

(22) PCT Filed: Nov. 25, 2019

(86) PCT No.: PCT/US2019/062957
§ 371 (c)(1),
(2) Date: May 27, 2021

(87) PCT Pub. No.: WO2020/112610
PCT Pub. Date: Jun. 4, 2020

(65) Prior Publication Data
US 2022/0022389 A1    Jan. 27, 2022

Related U.S. Application Data

(60) Provisional application No. 62/772,873, filed on Nov. 29, 2018.

(51) Int. Cl.
*A01G 24/44* (2018.01)
*A01G 13/02* (2006.01)

(52) U.S. Cl.
CPC ......... *A01G 24/44* (2018.02); *A01G 13/0268* (2013.01)

(58) Field of Classification Search
CPC ............ A01G 13/0268; A01G 13/0275; A01G 13/0281; A01G 24/00; A01G 24/44; A01G 24/46; A01G 9/02; A01G 9/033
(Continued)

(56) References Cited

U.S. PATENT DOCUMENTS

| 6,553,713 B2 | 4/2003 | Chiu |
| 8,533,992 B2 | 9/2013 | Harwood |

(Continued)

FOREIGN PATENT DOCUMENTS

| CN | 1134779 A | 11/1996 |
| CN | 101627718 A | 1/2010 |

(Continued)

OTHER PUBLICATIONS

Zhou, et al., Influences of the Fibre Hygroscopicity of Connecting Yarn on the Liquid Water Transfer Property of Knitted Double-Layer Fabric, Fibres & Textiles in Eastern Europe, 2010, vol. 18, No. 6(83), pp. 72-75.

(Continued)

*Primary Examiner* — David J Parsley
*Assistant Examiner* — Danielle A Clerkley
(74) *Attorney, Agent, or Firm* — McCarter & English, LLP

(57) ABSTRACT

Embodiments of the disclosure relate to soilless growth media with light reflecting and light absorbing surfaces for indoor farming and methods of using the media to germinate seeds and develop plants. In some embodiments, the soilless growth media can be a fabric made from two webs that can be joined together with a tie-in yarn linking the light reflecting plant supporting surface web yarn and the light absorbing web base yarn together in the fabric. The soilless growth media in embodiments of the disclosure can be used to reduce evaporation from nutrient delivery systems and improve controlled environmental agriculture operating efficiency.

6 Claims, 12 Drawing Sheets

(58) Field of Classification Search
USPC .................................. 47/32, 32.7, 59 S, 64
See application file for complete search history.

(56) References Cited

U.S. PATENT DOCUMENTS

| | | |
|---|---|---|
| 2012/0054061 A1 | 3/2012 | Fok et al. |
| 2014/0137471 A1 | 5/2014 | Harwood et al. |
| 2015/0027356 A1 | 1/2015 | Fok et al. |
| 2017/0172082 A1* | 6/2017 | Weiss ..................... A01G 31/02 |
| 2018/0220605 A1 | 8/2018 | Harwood |

FOREIGN PATENT DOCUMENTS

| | | |
|---|---|---|
| CN | 105007717 A | 10/2015 |
| JP | 2014-180237 A | 9/2014 |
| JP | 2016-501018 | 1/2016 |
| WO | WO 2003/037069 | 5/2003 |
| WO | WO 2006/045140 A1 | 5/2006 |
| WO | WO 2014/081663 | 5/2014 |
| WO | WO 2018/095884 | 5/2018 |

OTHER PUBLICATIONS

PCT International Search Report and Written Opinion dated Mar. 13, 2020 for PCT Application No. PCT/US2019/062957.
English Translation of Chinese Office Action and Search Report dated Mar. 11, 2022 for Chinese Application No. 201980090491.4.
English Translation of Japanese Office Action and Search Report dated May 24, 2022 for Japanese Application No. 2021-530859.
Extended European Search Report dated Jul. 19, 2022 for European Application No. 19891284.2.

* cited by examiner

SOILLESS GROWTH MEDIA FOR INDOOR AGRICULTURE

CROSS-REFERENCE TO RELATED APPLICATIONS

The present application is a 35 U.S.C. § 371 National Stage filing of International Application No. PCT/US2019/062957, filed on Nov. 25, 2019, which application claims priority benefit to provisional patent application entitled "Soilless Growth Media for Indoor Agriculture," which was filed on Nov. 29, 2018, and assigned Ser. No. 62/772,873. The content of the foregoing PCT application and provisional patent application is incorporated herein by reference.

TECHNICAL FIELD

Embodiments of the disclosure relate to soilless plant growth media and methods of using the media for indoor farming to germinate seeds and develop plants.

BACKGROUND

Indoor farms employing hydroponic or aeroponic growing techniques utilize soilless growth media to germinate seeds on and to support developing plants. In some aeroponic farming, the soilless growth media can be a cloth mounted on a metal tray and placed in a growth chamber where a nutrient solution is supplied to the roots from below the cloth. Light of suitable frequencies are provided to the developing plants from above the cloth.

Cloth is useful as a substrate for growing plants. It can be used to germinate seeds on its surface and allows penetration of roots from developing plants through the cloth. The cloth can be removed from the growth chamber, cleaned, and reused many times before it is recycled.

Rockwool is a growth media commonly used in indoor farming that is a fibrous substrate made from inorganic materials at high temperatures. Its fibrous nature generates small particles and makes handling the material cumbersome. Once rockwool has been used to grow plants, it is difficult to remove the roots and reuse the rock wool for growing other plants. High temperature and energy intensive re-melting and spinning may be used to reclaim the material.

Cloth has been used in performance garments to enhance the transfer of moisture away from the skin through the cloth and to the outer surface where it is evaporated. Such garments incorporate fibers that are more hydroscopic and aid in the transfer of moisture from the inner surface to the outer surface as described in Zhou, L., X. Feng, and Y. LI; Influences of the fiber hygroscopicity of connecting yarn on the liquid water transfer property of knitted double-layer fabric. Fibres & Textiles in Eastern Europe, 2010, Vol. 18, No. 6(83), pp. 72-75.

There is a continuing need for improved soilless growth media that can be reused many times, that are easy to handle and clean, and that improve the overall efficiency indoor farming.

SUMMARY

The embodiments disclosed herein meet these and other needs by providing an apparatus and method that improve the maintenance of a nutrient solution composition in an indoor growth chamber and that reduce costs associated with humidity control in indoor farms. The embodiments of the disclosure can reduce evaporation and/or overspray associated with the soilless growth media used in the development of plants in hydroponic or aeroponic growth chambers and can inhibit conditions for algae growth in such chambers.

Embodiments of the disclosure can include an indoor farming flat having a root permeable soilless growth medium substrate that can support the germination and development of plants, the root permeable substrate can have a light reflecting plant supporting surface and an opposing light absorbing base surface. The root permeable substrate may be positioned atop a support, the support can have a root side and a developing plant side. The substrate can be positioned atop the support with the light reflecting plant supporting surface of the substrate and the developing plant facing side of the support facing in the same direction and the light absorbing base surface of the substrate and the root side of the support can face the same direction when the substrate is positioned atop the support. The light reflecting plant supporting surface of the substrate reflects more light than the light absorbing base surface.

In some embodiments of the indoor farming flat, the light absorbing base surface of the soilless growth medium has a flat texture and absorbs more light than the light reflecting surface. In some embodiment, the light absorbing base surface of the soilless growth medium has a flat texture that absorbs between 20% to 96%, or more, light than the light reflecting plant supporting surface of the medium. In other embodiments, the light reflecting plant supporting surface of the substrate has a rough texture. In still other embodiments of the disclosure, the light absorbing base surface has a flat texture and the light reflecting plant supporting surface of the substrate has a rough texture. By absorbing more light than the light reflecting surface of the soilless growth medium, the light absorbing base surface can further reduce the amount of light reaching the nutrient solution located below the soilless growth medium and developing plant roots in a growth chamber.

Embodiments of the disclosure provide an indoor farming flat that incorporates a soilless growth medium which can include a fabric with a light reflecting plant supporting surface and a light absorbing base surface. Each surface of the fabric can have yarns and openings between portions of the yarns which allow penetration of the roots of developing plants therethrough. The fabric can be attached along its peripheral areas to a tray, the tray can have a root side and a developing plant side. The fabric can be positioned with the light reflecting plant supporting surface of the fabric and the developing plant side of the tray facing in the same direction and positioned with the light absorbing base surface of the fabric and the tray root side facing the same direction when the fabric is attached to the tray. In some embodiments the light reflecting plant supporting surface of the fabric can have a napped texture and includes a yarn with a color that reflects a greater amount of light than the yarn of the light absorbing base surface. The light absorbing base surface has a flat texture and can be made of a yarn that that absorbs more light than the yarn of the light reflecting plant supporting surface of the fabric. In some embodiment, the light absorbing base surface has a flat texture and comprises a yarn that that absorbs at least 20% more light than the yarn of the light reflecting plant supporting surface of the fabric. The fabric can be positioned in a stretched configuration on the tray, the fabric overlies the outer edges of the tray with good drape, and there are not scallops or gaps between the fabric and tray.

The fabric in embodiments of the disclosure can have a balanced or substantially balanced knit structure that can be formed from two separate webs. In some embodiments of the indoor farming flat the fabric has a balanced knit on the opposing web surfaces. In some embodiments of the indoor farming flat the fabric has a balanced knit on the opposing web surfaces and the webs are joined together. In some embodiments the fabric can be a double knit fabric that further includes a tie-in yarn linking or joining the light reflecting plant supporting surface web yarn and the light absorbing base yarn together in the double knit fabric. In some other embodiments the tie in yarn is the same color as the light reflecting plant supporting surface yarn. In still some other embodiments the tie in yarn is the same color as the light absorbing surface yarn.

In other embodiments of the indoor farming flat, the fabric further comprises a running stitch that has ends fixed to one or more edge or peripheral regions of the fabric. The running stitch can have a light reflecting color in some embodiments or a light absorbing color in other embodiments. In some embodiments the fabric can have two or more substantially evenly spaced running stiches. In still other embodiments of the indoor farming flat, the fabric is a double knit fabric that further comprises a running stitch that has ends fixed to one or more edge or peripheral regions of the fabric. The running stitch can have a light reflecting color in some embodiments or a light absorbing color in other embodiments. In some embodiments the double knit fabric can have two or more substantially evenly spaced running stiches.

In embodiments of the indoor farming flat of the disclosure the thickness of the layer comprising the light absorbing base surface can be less than 25% of the thickness of a layer comprising the light reflecting plant supporting surface.

The farming flat in embodiments of the disclosure can be used in indoor vertical farms for hydroponic or aeroponic growing. In some embodiments the farming flat can be used for indoor hydroponic or aeroponic growing. One embodiment of the disclosure is a growth chamber comprising the flat as described herein above, the flat positioned overtop of a nutrient supply source with a drip pan underlying the light absorbing base surface of the fabric and the nutrient supply source. The drip pan can be made of a light absorbing material. The growth chamber can be located in an indoor farm or greenhouse.

A further embodiment of the disclosure is a method of farming that includes the acts or steps of providing light of one or more wavelengths suitable for developing plants to the light reflecting plant supporting surface of a soilless growth medium and developing plants thereon. The soilless growth medium further includes a light absorbing base surface. The soilless growth has opening that permit the penetration of roots through the thickness of the soilless growth medium. In some embodiments, the light absorbing base surface and the light reflecting plant supporting surface of the soilless growth medium can be a fabric that includes yarns and openings for roots between portions of the yarns. The soilless growth medium can be positioned or attached along peripheral areas of a tray that has a root facing side and a developing plant facing side. The soilless growth medium can be positioned or attached to the tray with the light reflecting plant supporting surface of the fabric and the developing plant side of the tray facing in the same direction when the soilless growth medium is positioned or attached to the tray. The light absorbing base surface of the soilless growth medium and the root side of the tray face in the same direction when the soilless growth medium is positioned or attached to the tray. The light reflecting plant supporting surface of the soilless growth medium can have a rough or napped texture in some embodiments and can include a yarn that has a color that reflects more light used for developing plants than a yarn that can make up the light absorbing base surface. The light absorbing base surface can have a flat texture and can include a yarn that that absorbs more light used for developing plants than a yarn that can be used for the light reflecting surface. In some embodiment, the light absorbing base surface has a flat texture and comprises a yarn that that absorbs at least 20% more light than the yarn of the light reflecting plant supporting surface of the fabric. The soilless growth medium can be in a stretched configuration on the tray to form a flat; the soilless growth medium drapes over the outer edges of the tray, and there are not scallops or gaps between the soilless growth medium and tray.

Some embodiments of the method include providing a nutrient solution to the roots of developing plants protruding through the light absorbing base surface of the soilless growth medium or in other embodiments to the light absorbing base surface web of the fabric. In some other embodiments of the method the nutrient solution can be provided as a spray of nutrient solution to the light absorbing base surface of the soilless growth medium or in other embodiments to the light absorbing base surface web of the fabric.

In embodiments of the method, a fabric soilless growth medium can have a balanced or substantially balanced knit structure that can be formed from two separate webs. In some embodiments of the indoor farming flat the fabric has a balanced knit on the opposing web surfaces. In some embodiments of the indoor farming flat the fabric has a balanced knit on the opposing web surfaces and the webs are joined together. In some embodiments the fabric is a double knit fabric that further includes a tie-in yarn linking or joining the light reflecting plant supporting surface web yarn and the light absorbing base yarn together in the double knit fabric. In some other embodiments the tie in yarn is the same color as the light reflecting plant supporting surface yarn.

Another embodiment of the disclosure is a method of making an indoor farming flat that includes positioning or attaching a light absorbing base surface side of a replaceable soilless growth medium onto a tray. The tray has a root facing side and a developing plant facing side. The soilless growth medium is root penetrable and positioned on the tray with the light reflecting plant supporting surface of the soilless growth medium and the developing plant side of the tray facing in the same direction when the soilless growth medium is positioned on the tray. The light absorbing base surface of the soilless growth medium and the root side of the tray face the same direction when the soilless growth medium is positioned on the tray. A still further embodiment of the disclosure is a method of making a flat that includes attaching a light absorbing base surface side of a replaceable fabric made from two webs onto a tray. The tray has a root facing side and a developing plant facing side, the fabric made from two webs is attached to the tray with the light reflecting plant supporting surface of the fabric and the developing plant side of the tray facing in the same direction when the fabric is attached to the tray; the light absorbing base surface of the fabric and the root side of the tray face the same direction when the fabric is attached to the tray. In some embodiments of making a flat, the fabric includes one or more running stitches, the running stiches can be fixed to a portion of the fabric one or more attachment points on perimeter edges of the fabric. The fabric can be a double knit fabric. The replaceable soilless growth medium can be removed from the tray, cleaned to remove roots and debris, and reused for developing plants. In other embodiments the replaceable soilless growth medium can be removed from the tray and composted.

Embodiments of the disclosure can include a method of maintaining a nutrient solution composition concentration in a growth chamber that utilizes a soilless growth medium. In some embodiments the soilless growth medium is a fabric growth medium that has a balanced structure and is made from separate webs. One web surface of the soilless growth medium can have a napped light reflecting plant supporting surface with developing plants thereon and the other soilless growth medium surface can have a flat light absorbing base surface with roots extending therethrough. The method includes the steps or acts of applying an effective amount of nutrient solution onto the roots of developing plants that protrude through the light absorbing base surface. The nutrient solution can be provided to the absorbing base surface and plant roots from a source such as a spray nozzle, a tank, a nutrient film, or combinations of these that can be positioned below the light absorbing base surface of the soilless growth medium. The method can further include providing light for developing plants to the light reflecting plant supporting surface of the soilless growth medium and developing plants and/or providing airflow across the light reflecting surface and developing plants.

Advantageously embodiments of the disclosure facilitate and improve the maintenance of nutrient solution compositions used in hydroponic and aeroponic growth chambers and vertical farming systems. The soilless growth media in embodiments of the disclosure can reduce the evaporative loss of water from these nutrient solutions. Less evaporative losses can require less make-up water be added to the nutrient solution during a growth cycle, can reduce operational and equipment costs associated with making the additions, and can provide a more consistent growth environment for the developing plants. The lower amount of water evaporated from these soilless growth media can also reduce the size and operating cost for air conditioning equipment used to control humidity in an indoor farm. Embodiments of the disclosure can also reduce the amount of light that strikes the nutrient supply reservoirs and drip pans and can inhibit the growth of algae and costs associated with cleaning and algae removal from grow system components like drip pans and nutrient reservoirs. In embodiments where the soilless growth medium is a fabric, the fabric can have a balanced structure, which can result in less curling and scalloping gaps at the tray edges to which the fabric is attached. Fewer scalloping gaps and less curling reduce nutrient loss and plant leaf burning due to gaps and nutrient overspray at the edges of the flat. The un-napped or flat surface texture of the light absorbing base surface allows the fabric to be cleaned more easily and with reduced plant residue burden on the fabric, so that less cleaning solution is needed to recondition the fabric between growing cycles compared to a fabric with napped surfaces on both sides. The flat un-napped surface also allows the fabric to be stacked for repair with greater ease.

BRIEF DESCRIPTION OF THE DRAWINGS

A more complete understanding of the present disclosure and the advantages thereof may be acquired by referring to the following description, taken in conjunction with the accompanying drawings in which like reference numbers indicate like features and wherein:

FIG. 3B further illustrates curls and scallops along edges of the fabric that form gaps with edges of the trays and results in reduced growing area on the flats.

DETAILED DESCRIPTION

Figure 1:
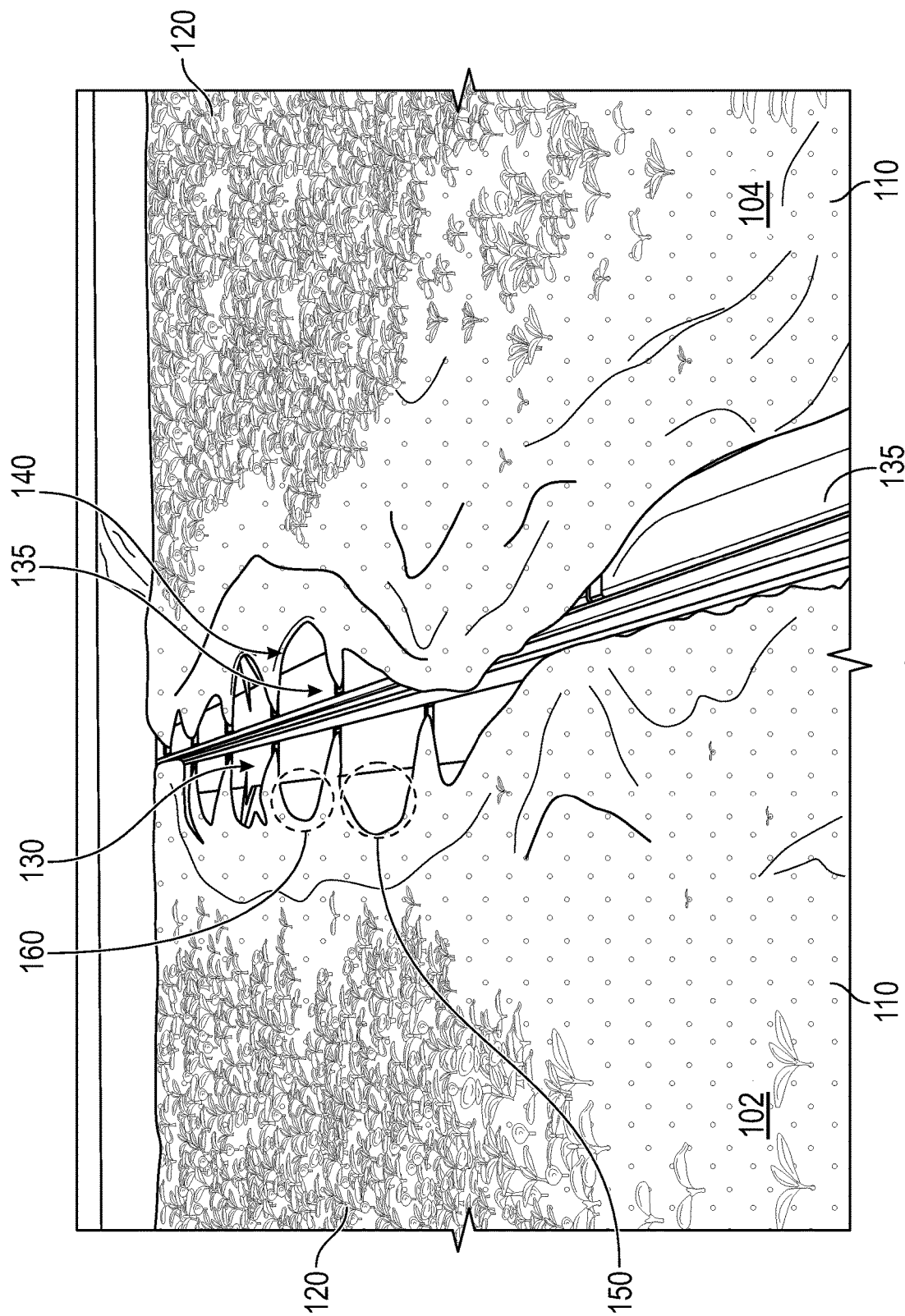
FIG. 1 is an image of a cloth of the prior art with developing plants on a top surface that illustrates scallops and gaps between the edges of the cloth soilless growth medium and support frames.

In the following description, it is understood that terms such as "top," "bottom," "outward," "inward," and the like are words of convenience and are not to be construed as limiting terms. Reference will now be made in detail to embodiments of the disclosure, which are illustrated in the accompanying figures and examples. Referring to the drawings in general, it will be understood that the illustrations are for the purpose of describing particular embodiments of the disclosure and are not intended to limit the same.

Whenever a particular embodiment of the disclosure is to comprise or consist of at least one element of a group and combinations thereof, it is understood that the embodiment may comprise or consist of any of the elements of the group, either individually or in combination with any of the other elements of that group. These, and other, aspects of the embodiments will be better appreciated and understood when considered in conjunction with the description and the accompanying drawings. The description, while indicating various embodiments and numerous specific details thereof, is given by way of illustration and not of limitation. Many substitutions, modifications, additions or rearrangements may be made within the scope of the various embodiments, and the disclosure includes all such substitutions, modifications, additions or rearrangements.

A problem with cloth media of the prior art that is positioned on a frame or tray in a stretched configuration is that the edges of the cloth can curl away from frame edges and can form scallops and gaps at attachment points with the frame. Scallops and gaps can lead to an improper fit of the cloth over the tray and less than full utilization of the cloth surface for growing. The curls or scallops can also form openings or gaps between the frame or tray and cloth which allows the nutrient solution supplied to the plant roots from below to come in contact with the developing plants on the upper surface of the cloth. Contact of the nutrient solution with the stems and leaves of developing plants causes plant damage and the loss of product. Cloth with excessing curling can become unusable and require repair or replacement which increases overall operating costs and creates waste.

Evaporation of water contained in the nutrient solution from the surface of these soilless growth cloth materials can be high. This evaporation can lead to increased fixed costs and operating costs for air conditioning to control humidity in an indoor growing environment. Evaporation from the cloth can also lead to changes in the concentration of the nutrient solutions over time and adjustment to nutrient solution compositions become necessary to maintain constituent concentrations. There is a need to reduce evaporation from the soilless growth media while also allowing root penetration through the media.

FIG. 1 is an image of a cloth soilless growth medium 110 of the prior art with developing plants 120 on a top surface of the cloth. The cloth 110 is shown attached or secured to adjacent Flat A 102 and Flat B 104, trays or frames 130 and 135 respectively, in a growth chamber. FIG. 1 illustrates scallop shaped gaps 140, 150, and 160 between the cloth edge and straight edges of the frame or tray. The cloth does not have good drape along all the edges of the underlying tray. The fabric rolls or curls under along the scallops. The gaps 140, 150, and 160 illustrated in FIG. 1 reduce the area of cloth available for growing plants and can permit nutrient spray from nozzles located below the cloth to contact and damage the plants 120. Evaporation of water from the nutrient solution through these gaps can also be high.

Figure 2:
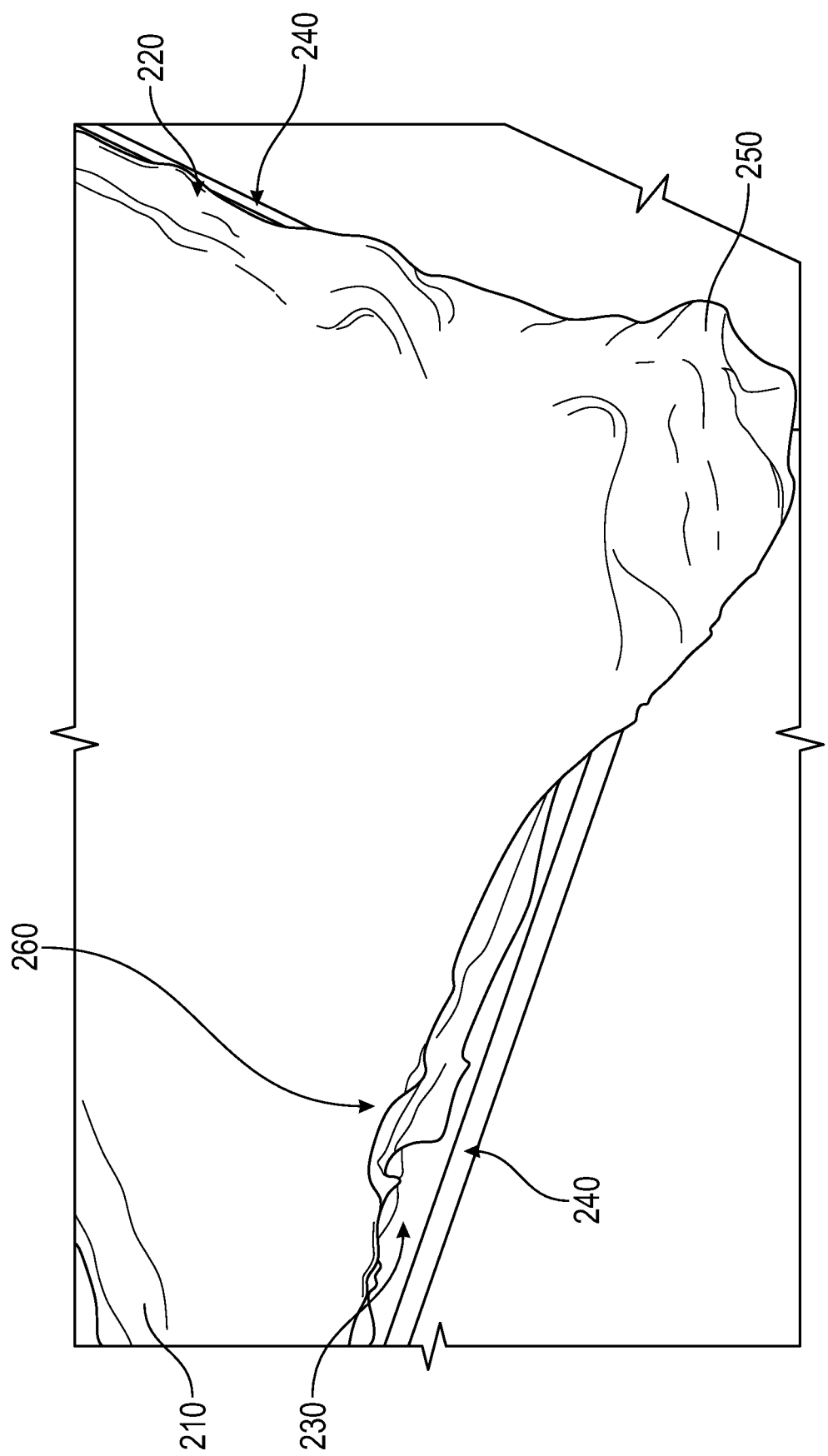
FIG. 2 is an image of a cloth of the prior art mounted to a tray without developing plants that illustrates curls and gaps between the fabric and edges of the frame.

FIG. 2 is an image of a cloth 210 of the prior art attached to a top surface 230 of a frame or tray 240 by one or more grommets. The cloth is in a stretched configuration. The side edges of the tray 240 are illustrated being exposed by curled fabric at 220 and 260 and covered by overhanging fabric at corner 250 of frame. FIG. 2 illustrates fabric curls and gaps at 220 and 260 along edges of the frame 240 and is an example of a fabric that does not have good drape along the edges of a frame. The curls can lead to gaps and reduced growing area on the flat. The cloth in FIG. 2 has a napped top surface texture and a napped bottom surface texture.

Figure 3A:
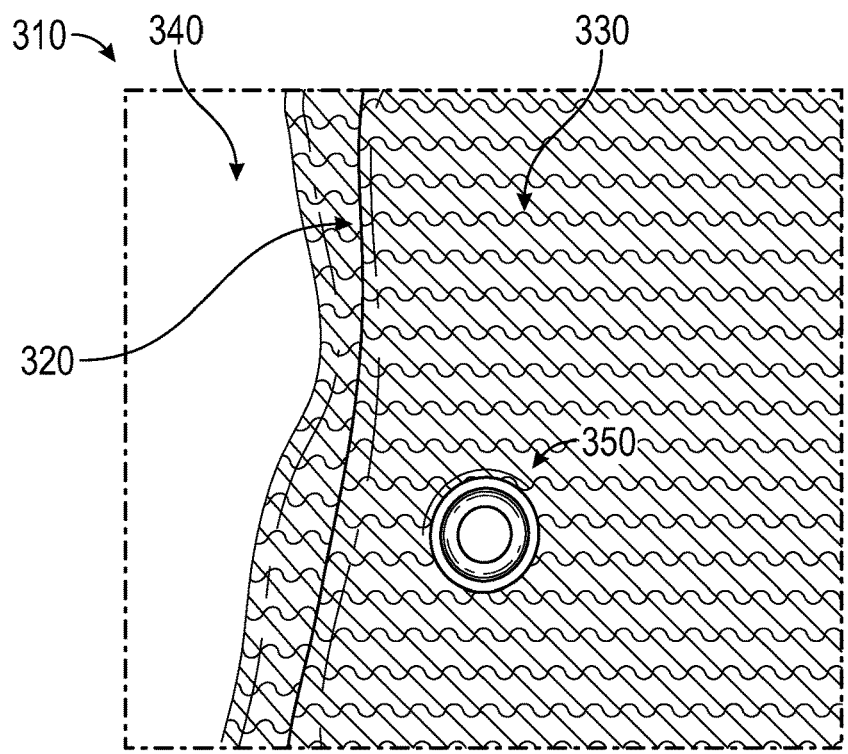
FIG. 3A is an image of an unstretched cloth with a napped side and an un-napped side and a curl formed along an edge of the fabric.
Figure 3B:
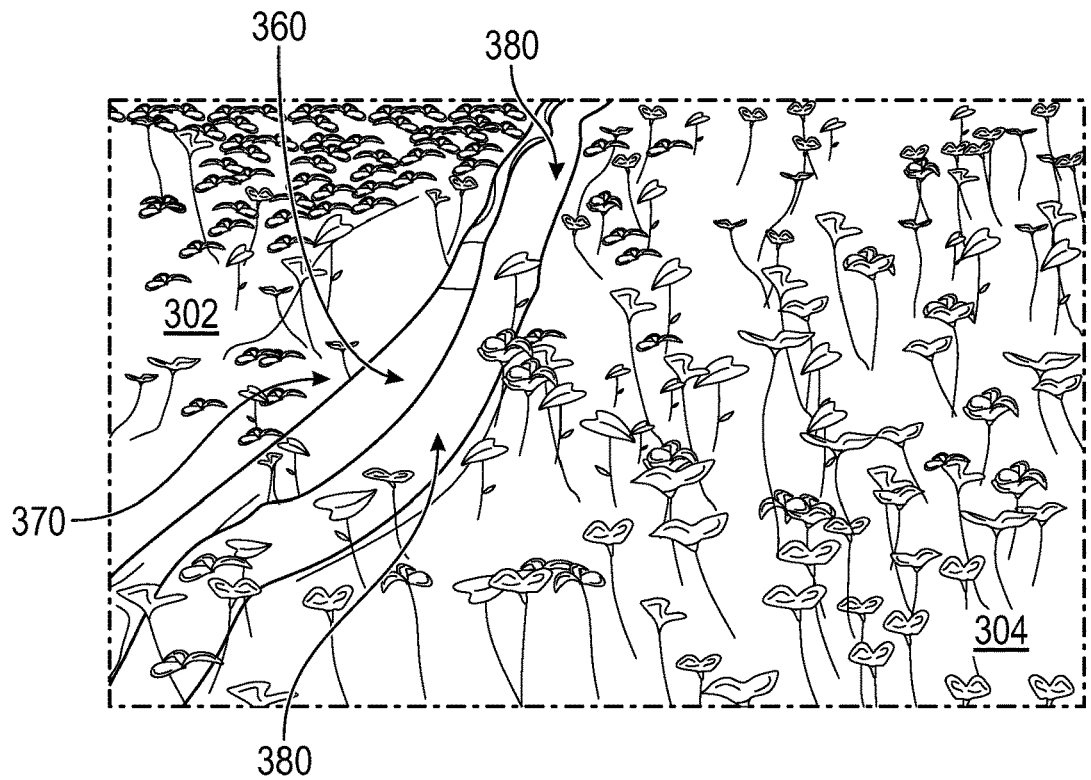
FIG. 3B is an image of Flat A and Flat B, which are adjacent, with the fabric of FIG. 3A attached to underlying trays; Flat A and Flat B having developing plants on their top surfaces.

FIG. 3A is an image of a cloth 310 with a napped side 330 and an un-napped side 340 and a curl 320 formed along an edge of the fabric which curled up in the direction of the un-napped side 340. The image illustrates an example of an unbalanced fabric. A fixture 350 (a grommet) is secured to the fabric and can be used to attach the cloth to a tray or frame. FIG. 3B is an image of the fabric shown in FIG. 3A on two adjacent flats, Flat A 302 (left) and Flat B 304 (right), with developing plants on a top surface of each flat. FIG. 3B illustrates a gap 360 between Flat A 302 fabric and Flat B 304 fabric formed by curl 370 (fabric on Flat A 302) and curl 380 (fabric on Flat B 304). Curls and scallops like these along an edge of the fabric can form gaps 360 with the tray edges or frame edges and reduces growing area on the flat(s). Reduced growing area on the flats increases costs for producing crops.

Figure 13B:
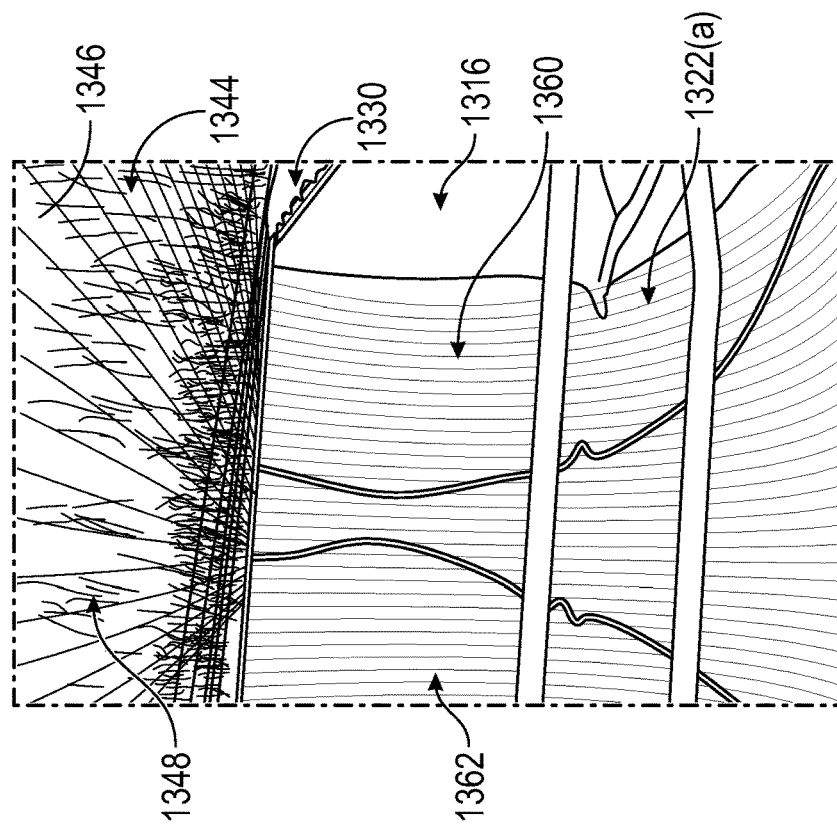
FIG. 13 (A-B) illustrates the reduction in light passing through a root permeable soilless growth medium substrate in an embodiment of the disclosure that supports the germination and development of plants and which has a light reflecting plant supporting surface and an opposing light absorbing base surface as compared to adjacent root permeable substrates that have light reflecting plant supporting surfaces and a light reflecting base surfaces; the amount of light passing through the substrates indicated by the amount of light and appearance of the light reflected from a drip pan surface below the two different substrates.
Figure 13A:
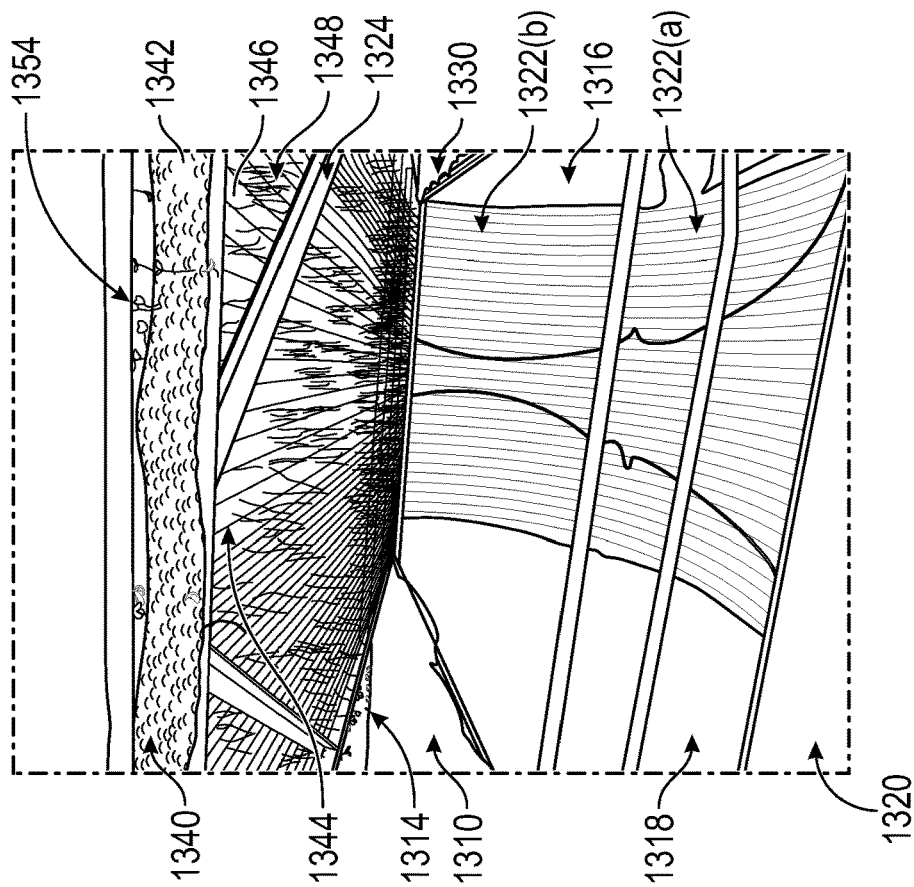

Embodiments of the disclosure provide an article, which can be an indoor farming flat, that incorporates a soilless growth medium. The soilless growth medium can have a light reflecting plant supporting surface and a light absorbing base surface. Each surface of the soilless growth can have openings which allow penetration of the roots of developing plants from the light reflecting plant supporting surface and through to the light absorbing base surface. The soilless growth medium can be positioned atop a tray, the tray has a root side and a developing plant side. The indoor farming flat in embodiments of the disclosure can be used in indoor vertical farms for hydroponic or aeroponic growing. In some embodiments the indoor farming flat can be positioned overtop of a nutrient supply source or container that can be made of a light absorbing material. In FIG. 6 A, the center indoor farming flat A is an example of an indoor farming flat having a soilless growth medium in embodiments of the disclosure that can be positioned atop a tray with developing plants thereon in a growth chamber. FIG. 13 A further illustrates an indoor farming flat positioned in a growth chamber over a drip pan and nutrient supply source. The soilless growth medium in FIG. 13A illustrates a root permeable substrate that supports the germination and development of plants and that has a light reflecting plant supporting surface and an opposing light absorbing base surface.

Embodiments of the disclosure can include an article such as an indoor farming flat or a grow system having a root permeable soilless growth medium substrate that can support the germination and development of plants on the substrate. The root permeable substrate can have a light reflecting plant supporting surface and an opposing light absorbing base surface. The root permeable substrate may be positioned atop a support such as a tray or frame, the support can have a root side and a developing plant side. The soilless growth medium substrate can be positioned atop the support with the light reflecting plant supporting surface of the substrate and the developing plant facing side of the support facing in the same direction and the light absorbing base surface of the substrate and the root side of the support facing the same direction when the substrate is positioned atop the support. The light reflecting plant supporting surface of the substrate reflects more light than the light absorbing base surface. In some embodiments of the article, the light absorbing base surface of the soilless growth medium substrate has a flat texture and absorbs more light than the light reflecting surface. In some embodiment, the light absorbing base surface of the soilless growth medium has a flat texture that absorbs between 20% to 90%, or more, light for developing plants than the light reflecting plant supporting surface of the substrate. In other embodiments, the light reflecting plant supporting surface of the substrate has a rough texture. In still other embodiments of the disclosure, the light absorbing base surface has a flat texture and the light reflecting plant supporting surface of the substrate has a rough texture. In some embodiments the rough texture can be the nap of a fabric or cloth.

Some embodiments of the disclosure relate to an apparatus and method for aeroponic or hydroponic growing that utilize a soilless growth medium. The soilless growth medium can be a fabric formed by two joined knit webs that can substantially reduce fabric curling and nutrient solution evaporation. The soilless growth medium in embodiments of the disclosure can increase available growing area on the flats, can improve the maintenance of a nutrient solution composition in a growth chamber, and can reduce costs associated with humidity control in indoor farms. The soilless growth medium can reduce evaporation and/or overspray associated with prior art soilless growth media used in the development of plants in hydroponic or aeroponic growth chambers.

In embodiments of the disclosure, the term "developing plant(s)" can refer to one or more germinating seeds, one or more seedlings with or without true leaves, one or more growing plants, or any combination of these that are on a generally top surface of the growth medium.

Embodiment of the disclosure can use soilless growth media including textiles such as fabrics, cloths, and composite materials including cellulose. Soilless growth media in embodiments of the disclosure support seed germination and plant development. In some embodiments the soilless growth medium and can be made of interlacing fibers, yarns, threads and combinations of these. The terms cloth and fabric may be used interchangeably in the disclosure and claims.

In embodiments of the disclosure a "side" of a soilless growth medium can also be referred to as "a surface", "a layer", or in some cases "a region" depending upon the general characteristics including texture or roughness of the side of the growth medium being referred to. The terms side, surface, layer, and region, can be used interchangeably throughout the specification. For example, reference to a plant supporting surface can also be reference to a plant supporting layer, a plant supporting region, or a plant supporting side, depending on the soilless growth medium and its texture. Similarly, reference to a light absorbing base surface can also be a reference to a light absorbing base layer, a light absorbing base region, or a light absorbing base side, depending on the soilless growth medium and its texture.

In embodiments of the disclosure, the soilless growth media can have a light reflecting plant supporting surface and a light absorbing base surface. The light reflecting plant supporting surface of the substrate can absorb less light used to develop plants than the light absorbing base surface. The light reflecting plant supporting surface of the substrate can also reflect more light used to develop plants than the light absorbing base surface. The light reflecting plant supporting surface of the soilless growth medium can be made of a material that reflects light used to develop plants. The light reflective material can have a color, for example a light color like yellow, it can have an appearance that can be white, or it can have another physical characteristic such as a metal, or any combination of these that causes light to be reflected from the light reflecting plant supporting surface. The light absorbing base surface of the soilless growth medium surface can be made of a material that absorbs light used to develop plants. The light absorbing material can have a color, for example a dark color like gray or brown, it can have an appearance that can be black, or it can have another physical characteristic that traps light and can convert it to heat, or any combination of these that causes some light to be absorbed by the light absorbing base surface.

In embodiments of the disclosure, one or more surfaces on the fabric, textile or other soilless growth medium material can be subjected to a brushing, sanding, napping, or similar operation, herein broadly referred to as "napping," to produce raised fibers at the surface of the material or fabric, thereby increasing the thickness and surface area of the material, yarn, or fabric comprising the soilless growth medium. In other embodiments the textile or fabric may be subject to a brushing, dimpling, or other operation to produce a rough texture on one or more surfaces of the soilless growth medium.

Good drape refers to a fabric, textile, or other soilless growth medium material in embodiments of the disclosure that fits over all the edges of a tray or frame. In some embodiments of the disclosure, a fabric made up of the yarn webs can be in a stretched configuration when attached to the tray and the fabric can have good drape over the edges of the tray. FIG. 5B illustrates a fabric or textile with good drape that is attached to a frame in a stretched configuration. In FIG. 5B the fabric has good drape 570 over the edge of the tray. Good drape is important quality for textiles, fabrics, and other soilless growth media used on flats because it eliminates gaps between the fabric or soilless growth media and tray which can reduce evaporation of nutrient solution and reduce nutrient overspray onto the plants in aeroponic growth systems. Good drape of the soilless growth media or fabric also maintains the useful growing area of a flat by eliminating gaps between the fabric and tray.

A growth chamber in embodiments of the disclosure includes a tray with a soilless growth medium positioned atop of or attached to the tray and adapted to secure plants above the root portions. The roots protrude through the soilless growth medium and can be directly exposed to a nutrient solution and the growing atmosphere using hydroponic or aeroponic methods. The nutrient solution can be provided to the roots by a source such as a spray nozzle, fogger, a tank, or other container that is positioned below the light absorbing base surface of the soilless growth medium. The growth chamber can further include structures for collecting unused nutrient solution and a device that recirculates the collected nutrient solution back to the plant roots. The growth chamber can include one or more sources of light, for example light emitting diodes or high-pressure sodium lamps, that provide enough photons of proper wavelength for developing plants. Generally, seeds are deposited on the top surface of a soilless growth medium supported or attached to the tray or frame. The seeds are germinated on the soilless growth medium, and then soilless growth medium on the tray is placed in the growth chamber. In the growth chamber, the upper side of the soilless growth medium can be subjected to light of the proper wavelength and intensity to promote growth in the developing plants, the underside of the soilless growth medium and the developing root mass can receive the nutrient solution. The plants resulting from the seeds are harvested at a desired stage of growth. The growth chambers can be stacked on each other and/or located side by side to save space within a facility and to permit sharing the subsystems which provide the nutrient solution, temperature, humidity, and carbon dioxide to the growth chambers. In some embodiments of the disclosure, the nutrient solution source can be supplied to the growth chamber by a spraying apparatus that delivers a nutrient mist directly onto the exposed root portions of the plants. In some embodiments multiple growth chambers can be integrated into grow towers.

Soilless growth media, including fabrics, in embodiments of the disclosure include a light absorbing surface and a light reflecting surface. The light reflecting surface reflect more light used for developing plants than the light absorbing surface of the soilless growth media, and the light absorbing surface absorbs more light used for developing plants than the light reflecting surface. The light reflecting surface can have a light appearance, for example light yellow, off-white, a bright white, or a characteristic that reflects a majority of the incident light. In some embodiments the light reflecting surface is between 75% and 90% reflective for the incident light used to develop plants. The light absorbing surface can have a dark appearance such as black or violet, or a characteristic that absorbs a majority of the incident light used to develop plants. In some embodiments the light absorbing surface of the soilless growth media or fabric can absorb about 75% to 96% of the incident light (between 4% and 25% reflective) used to develop plants.

In some embodiments of the article, the light absorbing base surface of the soilless growth medium has a flat texture and absorbs more light used to develop plants than the light reflecting surface. In some embodiment, the light absorbing base surface of the soilless growth medium has a flat texture that can absorb between 20% to 96%, or more, light used to develop plants than the light reflecting plant supporting surface of the medium. In other embodiments, the light reflecting plant supporting surface of the substrate has a rough texture that can reflect between 20% to 90%, or more, light used to develop plants than the light absorbing base surface of the medium. In still other embodiments of the soilless growth medium of the disclosure, the light absorbing base surface of the soilless growth medium has a flat texture that can absorb between 20% to 96%, or more, light used to develop plants than the light reflecting plant supporting surface of the soilless growth medium, and the light reflecting plant supporting surface of the soilless growth medium has a rough texture that can reflect between 20% to 90%, or more, light used to develop plants than the light absorbing base surface of the medium. By absorbing more light than the light reflecting surface of the soilless growth medium, the light absorbing base surface can further reduce the amount of light reaching the nutrient solution located below the medium and developing plant roots. A flat texture for the light absorbing base surface can the reduce surface area available for absorbing and retaining nutrient solution and help reduce evaporation from the soilless growth medium.

A tray or frame in embodiments of the disclosure can refer to any size or shaped support for the soilless growth media of the disclosure. The tray can be positioned or mounted in a growth chamber and can include cross members to support the growth medium and frame structure. A tray or frame with a soilless growth medium position thereon, referred to herein as a flat or indoor farming flat, can be used to germinate seeds and develop plants. In some embodiments a frame with an optional wire insert, lattice, or support can be used as a tray to support the soilless growth media. The terms tray and frame can be used interchangeably in embodiments of the disclosure. Tray perimeters can be measured in meters or centimeters, and trays can have various geometric and non-geometric shapes. A tray can be mounted or installed on top edges, a lip, track, or other structure of a grow chamber. The soilless growth medium with seeds positioned on a frame can be placed into an open growth chamber. The upper side of the soilless growth medium with seeds can be subjected to light of the proper frequencies and moisture to promote the germination and growth of developing plants from the seeds. A nutrient solution can be brought in to contact with the developing root mass of the plants protruding from the light absorbing surface or layer by spraying or intermittent submersion, while controlling temperature, humidity, and carbon dioxide within the growth chamber. In hydroponic growing, the roots of the developing plants in the nutrient solution can be aerated or exposed to a source of oxygen while the humidity, temperature, and carbon dioxide of the air above the plants can be controlled. The developing plants from the aeroponic or hydroponic system can be harvested at a desired stage of growth.

In some embodiments, the soilless growth medium can be a fabric or cloth. One surface of the medium can be a light reflecting plant supporting surface with a napped texture including fibers or yarn that reflects more light for developing plants than the second light absorbing surface that has a flat texture and is made from fibers or yarn that absorbs more light than the yarn of the light reflecting surface. The fabric can consist of two webs that can be joined with a tie-in yarn. The fabric or cloth soilless growth medium with seeds can be placed into an open growth chamber. The upper side of the soilless growth medium with seeds can be subjected to light of the proper frequencies and moisture to promote the germination and growth of developing plants from the seeds. A nutrient solution can be brought in to contact with the developing root mass of the plants that protrude from the light absorbing surface of the fabric or cloth. For an aeroponic system, the nutrient solution can be brought into contact with the roots, for example by spraying or intermittent submersion, while controlling temperature, humidity, and carbon dioxide within the growth chamber. The developing plants are harvested at a desired stage of growth. For a hydroponics system the roots of the developing plants penetrating the soilless growth medium can be entirely or partially suspended in a nutrient solution. The developing plants in the soilless hydroponic growth medium can be placed in an open growth chamber and subject to light of the proper frequency. The roots of the developing plants in the nutrient solution can be aerated or exposed to a source of oxygen while the humidity, temperature and carbon dioxide of the air above the plants can be controlled. The developing plants from either the aeroponic or hydroponic system can be harvested at a desired stage of growth.

Advantageously fabric soilless growth media in embodiments of the disclosure, including knitted webs, can have a light reflecting plant supporting surface with a napped texture and a light absorbing base surface with an un-napped or flat texture that result in less water evaporation from the fabric. Less evaporation from a fabric soilless growth medium is advantageous because it reduces water loss from the nutrient solution used in the growth chamber(s) thereby improving process stability. Less water loss also reduces equipment and operational costs associated with dosing equipment, sensors, and chemical analysis to maintain the nutrient solution concentration in growth chambers and also reduces equipment costs and energy used to maintain humidity levels in an indoor farm.

In some embodiments of the disclosure where the soilless growth medium is a fabric, the fabric can include two knitted webs joined together with a tie in yarn and the fabric can optionally further include a "running stitch" formed by passing a yarn or thread in and out of the one or more webs of the fabric. The running stitch can have ends fixed to one or more edge regions of the fabric and may optionally have the end of the stitch held by a fixture such as a grommet. One or more lines of running stitch may be used in the fabric. The yarn or thread forming the running stitch can have a color or reflect light similarly to one of the webs. Running stitches can be used, but other similar stitches including but are not limited to basting stitches or "tailor's tack", darning stitches, Holbein or double-running stitches, double darning stitches, or any combination of one or more of these can also be used.

The fabric used in some of the methods of indoor farming of the disclosure can be a double knit fabric with a tie-in yarn linking the plant supporting surface yarn web and the base yarn web together in the fabric. The tie in yarn can reflect light used to develop plants. The fabric used in the method can further comprise a running stitch, and the running stitch can have one or more of its ends fixed to one or more edge regions of the fabric. The running stitch can reflect light used to develop plants.

Figure 5A:
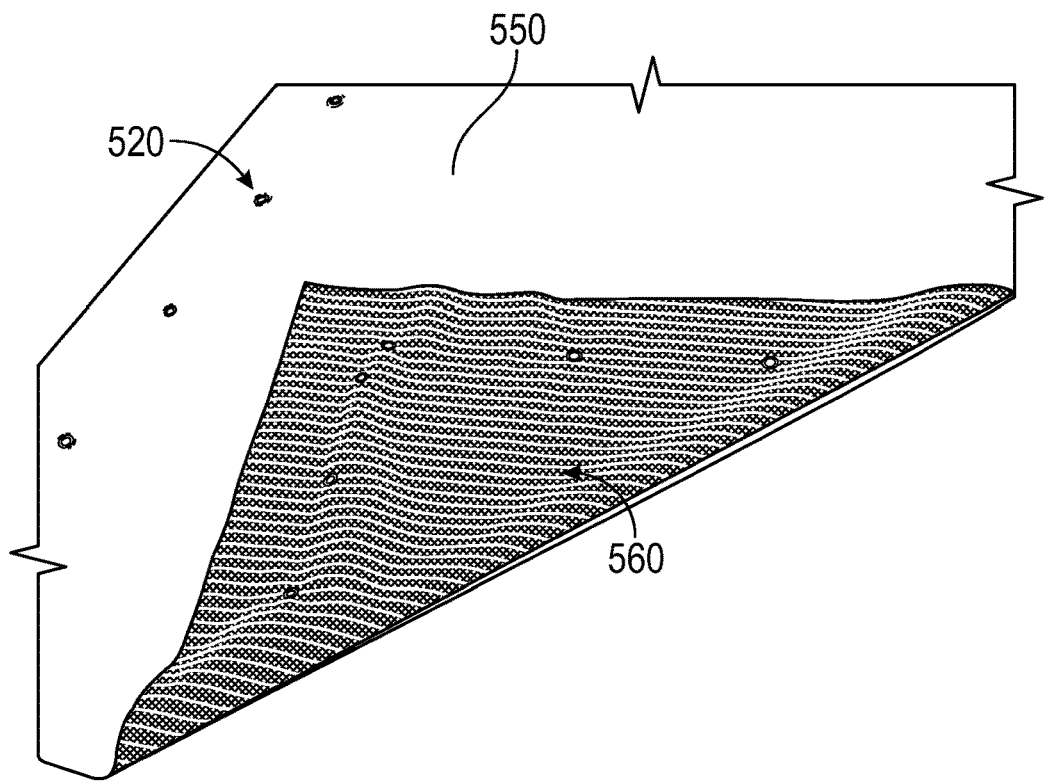
FIG. 5A is an image of a soilless growth medium that can be a fabric. The image illustrates the light reflecting side and the light absorbing side of the soilless growth medium along with fixtures for attaching the soilless growth medium to a tray.
Figure 5B:
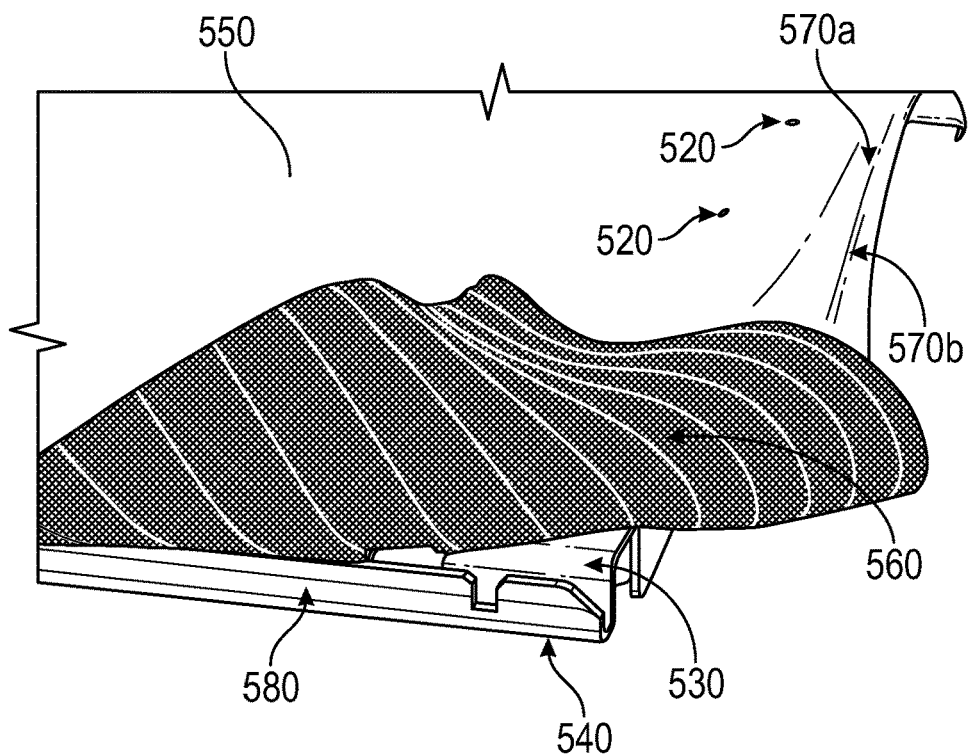
FIG. 5B is an image of a soilless growth medium that can be a fabric in embodiments of the disclosure. The image illustrates the light reflecting side and the light absorbing side having fixtures for attaching the soilless growth medium to a tray to form an indoor farming flat. Also shown are the root side and the developing plant sides of the tray.

FIG. 5A is an image of a soilless growth medium that is a fabric in embodiments of the disclosure illustrates the light reflecting side and the light absorbing side; the light reflecting side is shown having fixtures 520 attached along and through the peripheral area of the fabric. The fixtures can be grommets, hooks, snaps and the like and are used for attaching the fabric to a tray. FIG. 5B is an image of a soilless growth medium that is a fabric in embodiments of the disclosure showing the napped light reflecting plant supporting side 550 of the fabric and the non-napped light absorbing root side 560 of the fabric along with fixtures 520 attached to posts or hooks on the tray. Also shown are the root side or bottom side of the tray 540, the developing plant side or top side of the tray 530, and an edge 580 of the tray. The fabric is in a stretched configuration on the tray and the fabric is shown overlying the outer edge of the tray and is absent scallops or gaps between the cloth and tray. The fabric has good drape over the edges of the frame as illustrated by the underlying corner of the tray outer edge being visible under the draped fabric at 570a to 570b.

FIG. 5B also illustrates the soilless growth medium fabric attached along peripheral areas to the tray by fixtures 520 with the napped light reflecting plant supporting surface of the soilless growth medium fabric 550 and the developing plant facing top side of the tray 530 facing in the same direction when the fabric is attached to the tray; the non-napped light absorbing base surface 560 of the soilless growth medium fabric and the tray root bottom facing side of the tray 540 facing the same direction when the fabric is attached to the tray.

In some embodiments, not shown, the a soilless growth medium such as a fabric may be attached to the tray by a friction fit with one or more adjacent trays, walls of the growth chamber, or any combination of these. Edges of the fabric may be sandwiched or pressed between adjacent tray edges to hold the fabric. Further, a combination of friction attachment and one or more fixtures may be used to attach a fabric to a tray.

Figure 6B:
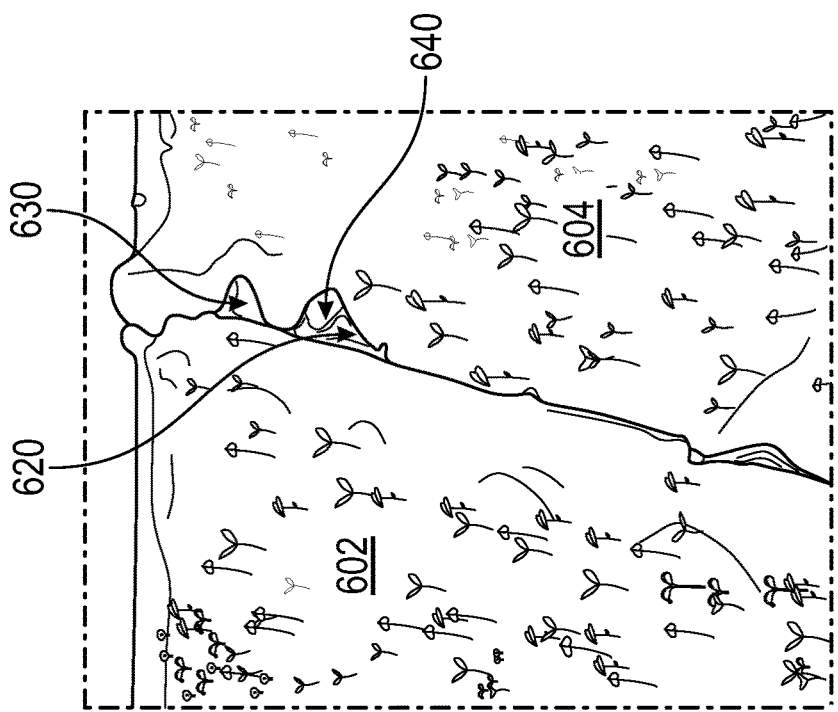
FIG. 6B is a close-up view of a top portion (dashed circle) of the image in FIG. 6A illustrating the region between indoor farming flat A (soilless growth medium in an embodiment of the disclosure) and flat B (prior art) further illustrating scallops formed along the edges of the flat B (prior art).
Figure 6A:
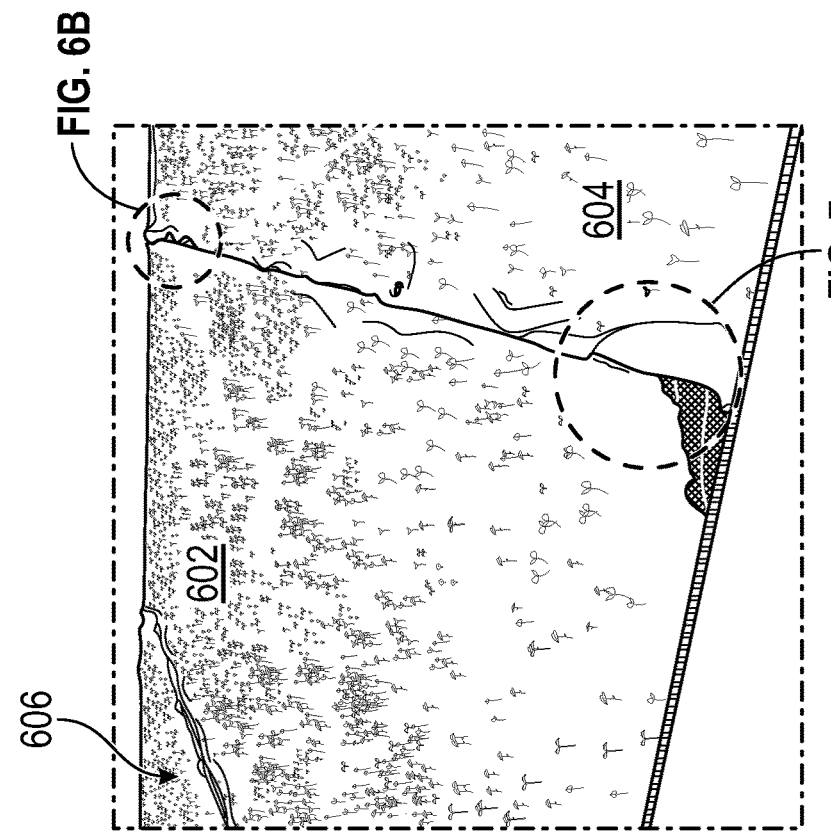
FIG. 6A is an image of three indoor farming flats: center image (indoor farming flat A) is an embodiment of an indoor farming flat in an embodiment of the disclosure having a fabric soilless growth medium attached to a tray with developing plants thereon in a growth chamber; right (flat B (prior art)) is a cloth of the prior art attached to a tray with developing plants thereon in the growth chamber; left (flat C (prior art)) is a cloth of the prior art (same cloth as flat B), attached to a tray with developing plants thereon in the growth chamber.

FIG. 6A is an image of three flats with different fabric soilless growth media, Flat A 602 and Flat B 604, and Flat C 606 in a growth chamber. Flat A 602 is an embodiment of the disclosure that is a fabric in a stretched configuration on the center tray, the fabric overlies the outer edges of the tray and is absent scallops or gaps. The fabric of Flat A 602 has good drape over the edges of the first tray and a structure similar to the media illustrated in FIG. 5 with a napped light reflecting plant supporting side of the fabric and a non-napped light absorbing root side of the fabric. Flat B 604, which is an example of the prior art, has a fabric that is napped on both surfaces and is a fabric in a stretched configuration on a right most tray, the fabric has scallops or gaps 630 and 640 between the fabric and tray 620. Flat C 606, also the prior art, has a fabric that is napped on both surfaces and is in a stretched configuration on a left most tray, the fabric also has scallops or gaps between the fabric and tray. FIG. 6B is a close-up view of a top portion of the image in FIG. 6A illustrating the region between Flat A 602 (embodiment of the disclosure) and Flat B 604 (prior art) further illustrating the scallops or gaps 630 and 640 of Flat B 604.

Figure 7:
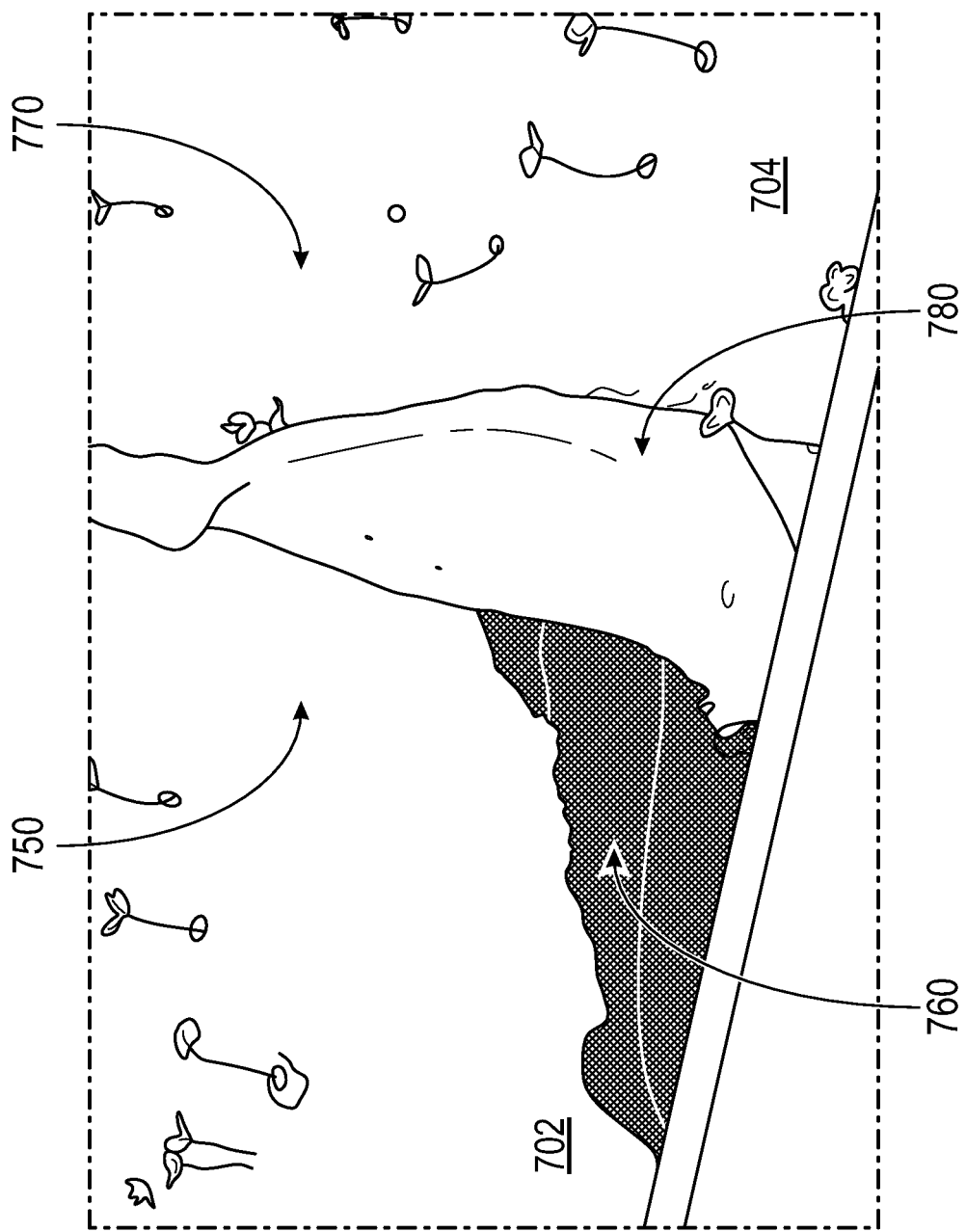
FIG. 7 is a close-up view of the bottom portion of the image in FIG. 6A illustrating the region between indoor farming flat A (soilless growth medium embodiment of the disclosure) and flat B (prior art) illustrating portions of the underside surfaces of the fabric on the two flats having different soilless growth media.

FIG. 7 is a close-up view of the bottom portion of the image in FIG. 6A illustrating the region between Flat A 702 (embodiment of a soilless growth medium of the disclosure) and Flat B 704 (prior art cloth material) illustrating portions of the underside surfaces of the fabric on the two flats of the different soilless growth media (the edge corners are folded up to show the bottom surfaces). The fabric soilless growth medium on Flat A 702 has a napped texture 750 on the upper light reflecting surface and an un-napped 760, flat, texture on the lower light absorbing surface. The fabric on Flat B 704 has an upper light reflecting surface 770 with a napped texture and a lower light reflecting surface 780 with a napped texture.

The soilless growth medium can have an overall thickness and each of the light reflecting and light absorbing layers or regions of the soilless growth medium can have separate thicknesses. In some embodiments of the disclosure, the soilless growth medium can have an overall thickness of about 3 millimeters or less, in some embodiments the overall thickness of the soilless growth medium can be from 2 millimeters (mm) to 3 millimeters. Thinner soilless growth media can be beneficial in reducing the amount of moisture stored and evaporated from the medium. In some embodiments the light absorbing surface or layer of the soilless growth medium can have a thickness that is greater than 0 millimeters to about 1 mm and a roughness that is greater than 0 millimeters in height and less than about 0.5 mm in height. For some soilless growth media, a thicker light absorbing layer can block more light than thinner layers, especially in areas of the growth medium absent penetrating roots. In some embodiments the light reflecting surface or layer can have a thickness that is greater than 0 millimeters to about 2 mm and a roughness that is greater than 0 millimeters in height and less than about 2 mm in height. In some embodiments the roughness of the light reflecting surface or layer can be about 1-2 mm in height. The roughness of the light reflecting layer and the light absorbing layer can be measured between peaks and valleys of the uncompressed surface or layer. In embodiments of the disclosure where the soilless growth medium is a fabric, the overall thickness of the fabric can be about 3 millimeters or less. In some embodiments, the thickness of the fabric can be from 2 to 3 millimeters, with the light absorbing surface or layer being about 1 mm or less in thickness and the light reflecting surface or layer having an un-compressed nap with a roughness that is greater than 0 millimeters in height and less than about 2 mm in height. In some embodiments, the roughness of the un-compressed nap of the light reflecting surface layer is about 1-2 mm.

Figure 14:
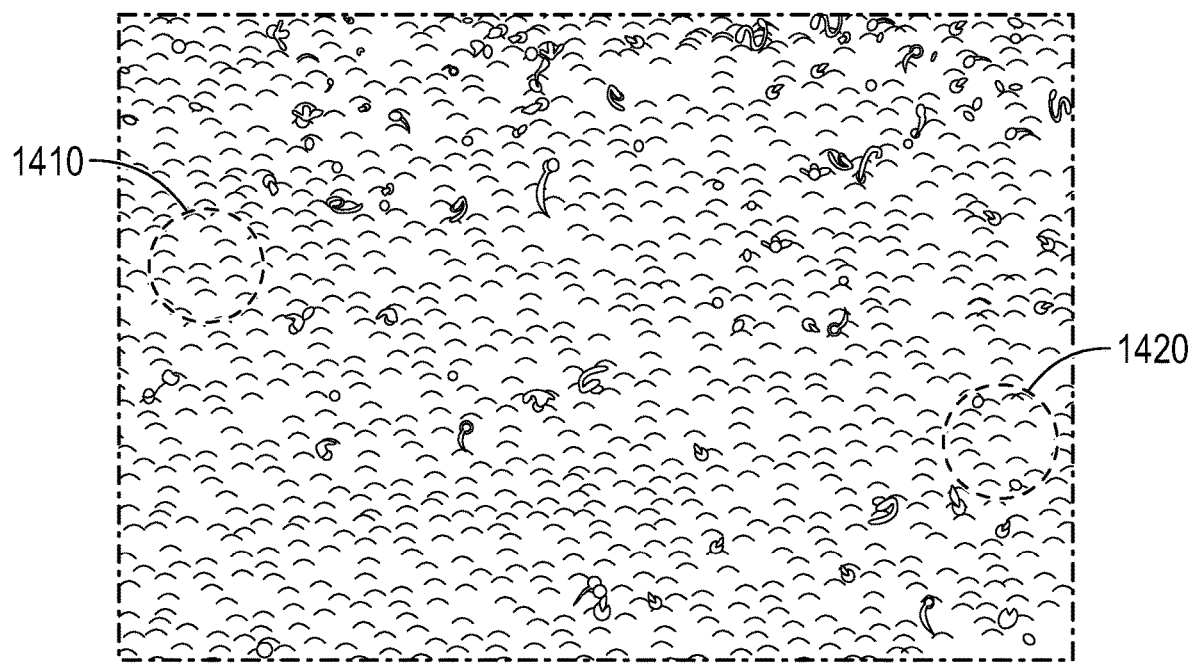
FIG. 14 illustrates a soilless growth medium surface that can have a texture that is substantially on the same scale as the size of the seeds.

In some embodiments of the disclosure the light reflecting surface that supports the plants and seeds can have a texture or roughness. The light reflecting surface of the soilless growth medium can have a texture that is substantially on the same scale or size as the seeds. The seeds can generally rest in the low areas between the raised texture, dimples, or nap of the soilless growth medium. For example, the outwardly directed nap of the soilless growth medium can have a feature size (e.g. size within a factor of about ±5× or less) similar to the size of the seeds. FIG. 14 illustrates a soilless growth medium surface that can have a texture with features illustrated by the small "⌒" bump like markings in dashed circle 1410 that are substantially on the same scale or size as the seeds as shown by the texture "⌒" and seeds "O" in the dashed circle 1420 in FIG. 14. In some embodiments of the disclosure the light absorbing base surface has a flat texture and absorbs more light than the light reflecting surface. In other embodiments the light reflecting plant supporting surface of the substrate has a rough texture. In still other embodiments of the disclosure, the soilless growth medium can have a light reflecting surface with rough texture and light absorbing base surface with a flat texture.

In embodiments of the disclosure where the soilless growth medium is a fabric, the fabric can have a balanced or substantially balanced structure. A balanced structure can be a fabric structure composed of two or more knitted webs where each web has an identical or nearly identical number of each type of stitch, produced by the cylinder and dial needle beds, which show on each fabric surface and usually in the same or substantially same sequence. An example of a balanced fabric structure composed of two or more knitted webs in an embodiment of the disclosure is a double knit fabric. The balanced fabric of two or more webs in some embodiments of the disclosure substantially conforms to a flat surface. In some embodiments, the fabric under stretching tension on a flat surface (similar to the top surface of a tray) has substantially parallel upper and lower sides, and is absent waves or curls along the edges of the fabric that form gaps having a height greater than twice the thickness of the fabric as measured between the flat surface and a curled surface of the fabric. In other embodiments the fabric under stretching tension on the flat surface has substantially parallel upper and lower sides, and is absent waves or curls along the edges of the fabric that form gaps having a height greater than the thickness of the fabric as measured between the flat surface and a curled surface of the fabric. An advantage of a fabric with a balanced structure or substantially balanced structure for use as a soilless growth medium, especially one that is stretched on a tray, is that the balanced fabric reduces or eliminates gaps formed by curling and scallops at the edges of the tray (compare for example Flat A (balanced) and Flat B (un-balanced) in FIG. 6A) thereby reducing nutrient solution evaporation, penetration of light into the drip pans causing algae growth, and increasing overall usable flat area for plant germination and development.

Figure 4:
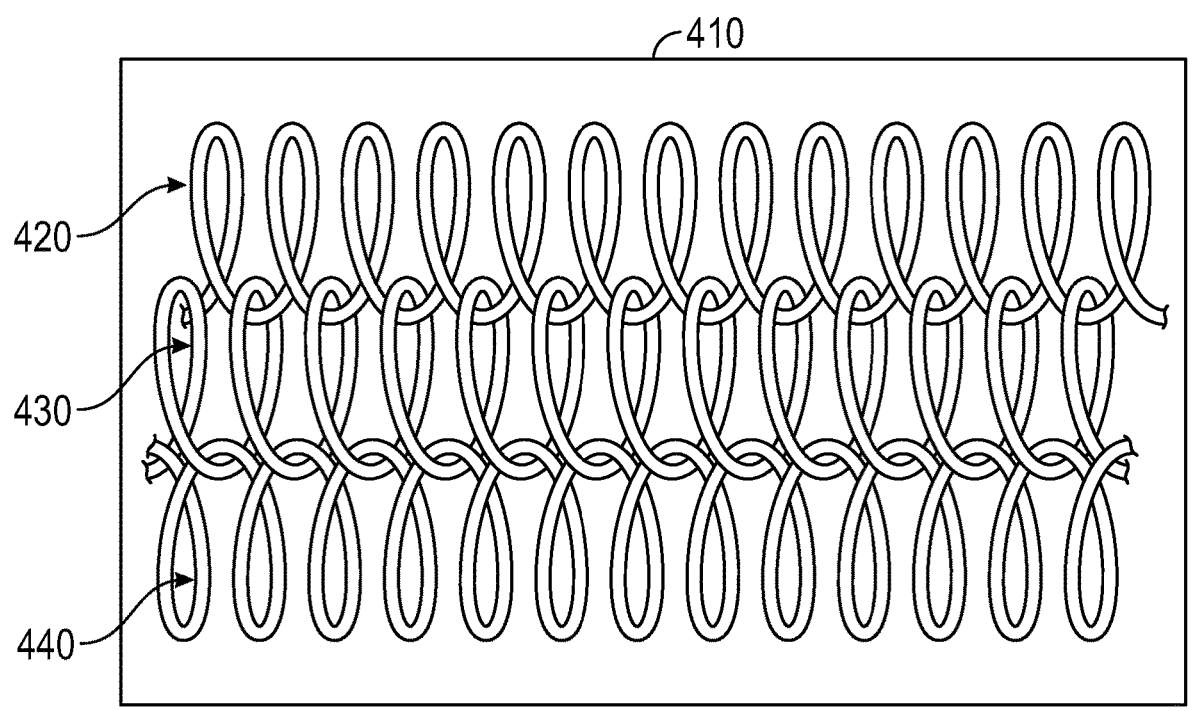
FIG. 4 is an illustration of the thread and structure of a soilless growth medium that is a fabric in embodiments of the disclosure.

FIG. 4 is an illustration of a cross-section of a fabric 410 structure that can be used for soilless growth media in some embodiments of the disclosure. The fabric includes webs 420 and 440. The webs can be formed using the cylinder and dial needles of a knitting machine. In some embodiments, for example as illustrated in FIG. 4, the separate webs 420 and 440 can be joined together by a tie or binding yarn that is looped intermittently, or looped continuously as shown in FIG. 4 by yarn or thread 430. One of the webs is made from yarns or threads that are light reflecting while the other web is made from yarns or threads the are light absorbing. The light reflecting web surface comprises a yarn that reflects more light than the yarn comprising the light absorbing web surface. In embodiments of the disclosure the yarns of the light reflecting surface can be roughened or napped and the yarns of the light absorbing base surface can have a flat or non-napped texture.

In some embodiments the fabric has a bi-directional stretch of between 0.1 and 20% in one (width between optional tracer lines) direction; and bi-directional stretch of between 0.1 and 10% in length (parallel to optional tracer lines) while positioning and attaching the fabric onto a frame. The fabric consisting of the two webs can thermally shrink. The amount of shrinkage depends upon the length of time the material is maintained at a given temperature. The material can be heated to at least the maximum temperature to be experienced during a cleaning cycle to limit the final shrinkage. In embodiments of the disclosure, the fabric shrinkage is less than 5%×5%. To achieve this level of dimensional stability the fabric can be held at the selected temperature for a time sufficient for the fabric to thermally shrink. The heat is then removed. Fabrics with reduced shrinkage during their lifetime are less prone to forming curls and scallops at the edges of trays.

In some embodiments the fabric further includes one or more running stitches (can also be referred to as a restraining yarn) with medium spacing in one or more control directions of the fabric. The thread used for the running stitch can have the same composition as the other threads in the fabric. In some embodiments the fabric includes one or more running stitches which can maintain the dimension(s) of the fabric on the tray. The running stitch can have ends fixed to one or more edge regions of the fabric. In some embodiments the running stitches can be fixed to areas where the grommets are secured to the fabric. The running stitch can have a light reflecting color in some embodiments of the fabric or a light absorbing color in other embodiments the fabric.

In some embodiments of the disclosure the fabric is a double knit napped fabric that is made of two webs united with a tie in or a binding thread. One web of the fabric can have a dark or black color and a semi dull un-napped surface finish with a first denier and filament count. The second web can have a light reflecting color with a pin brushed or napped finish and a semi dull finish and a second denier and filament count. The weight of the cloth can be between 225 and 250 grams per meter squared. Advantageously, light incident on the light reflecting surface that does pass through the napped portion of one of the webs can be partially or nearly completely absorbed by the darker light absorbing web. This light absorption can reduce growth conditions for any algae underneath the fabric or in an underlying drip pan. The un-napped surface of the fabric will hold less water than a napped surface. Trays with this fabric attached to them will be lighter because they retain less water, and less water can be transferred to the upper napped surface for evaporation.

The soilless growth media, cloth, or fabric, permits root penetration, provides controlled access to moisture, e.g., a nutrient solution, water, and the like, and can be configured and dimensioned to support seeds and plants thereon. The soilless growth media, cloth or fabric can be selected from a group consisting of, e.g., a polyester material, an acrylic material, a non-biodegradable synthetic material, and the like, with or without napping. The growth systems generally include at least one of soilless growth media, support elements for the soilless media, a light source, and a nutrient solution source. In some embodiments of the disclosure one or more webs that make up the fabric can be 100% textured polyester.

The main yarn on the un-napped side of a fabric in embodiments of the disclosure can be extrusion dyed black. An optional guide line or tracer yarn can have a color or appearance that stands out against the black color and can be white, but other colors without limitation such as yellow or red are also possible. A 'tracer' yarn can be used for ease in non-bias width cutting as illustrated by the white lines on the black light absorbing surface of the fabric in FIG. 5A and FIG. 5B. The tracer yarn can also advantageously aid in the placement of fixtures such as grommets to attached the fabric to corresponding protrusions on the tray. The tracer yarn can optionally be one or more of the running stitches. The tracer can be any material incorporated into the soilless growth medium that facilitates a user cutting the substrate in a particular direction or pattern.

The soilless growth medium fabric can be attached to a tray or frame to form a flat. In some embodiments of the disclosure, grommets secured to the fabric can be attached to hooks or protrusions on one or more surfaces of the tray. In other embodiments the fabric can be attached to the tray or frame using corresponding snaps, zippers, one or more clamps, and the like. The fabric is secured to the tray in a stretched configuration that provides a substantially flat fabric surface with no sags in the fabric that would cause puddling of nutrient solution or holes that allow passage of nutrient solution between openings of the frame and scallops formed by the stretched fabric. The fabric secured to the tray can be in a stretched configuration on the tray/flat. The fabric attached to the tray overlies the outer edges of the tray and can be absent scallops or gaps between the fabric and tray. The fabric secured to the tray can be sized to cover the top facing surface and overhang sides of the tray with good drape. In some embodiments the fabric can be sized to overhang the edges of the tray with good drape down to the thickness of the tray or to the bottom edge of the root side of the tray. In other embodiments the fabric can be sized to overhang the edges of a tray with good drape to below the tray edge, but less than twice the thickness of the tray edge. Minimizing the amount of fabric overhang can be advantageous because it reduces costs for fabric in an indoor farm that uses thousands of cloths; minimizing fabric overhang also limits or eliminates interference of the fabric with the roots for nutrient solution from a nutrient spray source.

General Experimental Conditions

In accordance with embodiments of the present disclosure, improvements to methods of aeroponic and hydroponic farming are also provided. Where an aeroponic system is utilized it included a growth chamber having a flat with a fabric attached to a tray, a drip pan, nutrient sprayers and drainage, and lighting as disclosed in Harwood US Pat. Pub. No. 20140137471 the contents of which are incorporated herein by reference in their entirety. Further, the method in embodiments of the disclosure generally includes spraying a nutrient solution on developing plant roots protruding from at least one light absorbing surface of the cloth/fabric. The fabric is secured to the underlying tray and can support germination and plant development in the presence of nutrient solution and remain substantially planar across the surface of the flat.

Systems of the present disclosure generally satisfy one or more germination factors and plant developing factors as disclosed in Harwood. The germination factors can include at least one of, e.g., a temperature range, a pH level range, a relative humidity range, a light intensity range, a light spectrum, an electrical conductivity range, seed treatments such as scarification, prior heating or cooling, and the like. The temperature range can be from approximately 5° C. to approximately 35° C. The pH level range can be from approximately 4 to approximately 8. The relative humidity range can be from approximately 20% to approximately 100%. The light intensity range can be from approximately 0 $\mu mol \cdot m^{-2} \cdot s^{-1}$ to approximately 250 $\mu mol \cdot m^{-2} \cdot s^{-1}$. The light spectrum can be from approximately 400 nm to approximately 700 nm with some tolerance in the UV-B radiation, e.g., approximately 280 nm to approximately 315 nm. The electrical conductivity range can be from approximately 1.5 $dS \cdot m^{-1}$ to approximately 3.0 $dS \cdot m^{-1}$. For some seeds, a photoperiodism may exist which requires both light and dark periods. In some embodiments, e.g., for some cold season leafy greens (such as *Eruca* saliva), a preferred temperature can be approximately 22° C., the pH level range can be from approximately 5.0 to approximately 6.0, and in preferred implementations from approximately 5.0 to approximately 5.5, the electrical conductivity range can be from approximately 2.0 $dS \cdot m^{-1}$ to approximately 2.5 $dS \cdot m^{-1}$, and the relative humidity can be approximately 50%. In some embodiments, e.g., some cold season leafy greens, the light intensity during germination can be between approximately 50 $\mu mol \cdot m^{-2} \cdot s^{-1}$ and approximately 250 $\mu mol \cdot m^{-2} \cdot s^{-1}$ during the baby stage of maturity. Once a plant has emerged, up to approximately 1000 ppm of $CO_2$ may be applied for advantageous growth. In some embodiments, the light spectrum after germination can be approximately 440 nm blue and approximately 660 nm red. However, it should be understood that the ranges provided herein may be varied depending on the requirements and/or optimal environments for germinating and growing alternative seeds or plants.

Growing and development factors of plants on the sample soilless growth media cloth materials was generally performed in a single growth chamber using LED lighting, providing the same nutrient solution, and having substantially similar temperature, air movement, and humidity. Light intensity levels could be varied between greater than 0 micromoles per meter squared per second ($\mu mol^{-1}\ m^{-2}\ s^{-1}$) to 300 $\mu mol^{-1}\ m^{-2}\ s^{-1}$. Additional climate conditions in the growth chamber, including the temperature measured in degrees Celsius could be 5° C. to approximately 35° C. The nutrient solution electrical conductivity could be measured in deciSiemens per meter (dS/m). In particular, growing environmental conditions for the nutrient solution can include a nutrient temperature range of approximately 15° C. to approximately 25° C., a pH level range of approximately 4.3 to approximately 6.6, and an electrical conductivity range of approximately 1.3 dS/m to approximately 2.9 dS/m.

For wicking height, a strip of fabric material was placed in a pan with liquid; if necessary the cloth was pushed into the liquid to begin wicking. A soaking pan was filled with water and a small amount of red food coloring (e.g., food coloring including water, glycerin, FD&C red 40, citric acid, and sodium benzoate) was added to aid in determining the wicking height.

For absorbance, a strip of fabric measuring approximately 1 inch by 3.5 inches was cut for the test. The strip was placed on a clip and dropped into the soaking pan. The wick height was measured at approximately 3 minutes and approximately 6 minutes after dropping. The strips of cloth were then allowed to soak in the soaking pan, removed from the soaking pan and allowed to drip, i.e., drops were allowed to drip off each cloth until more than about five seconds passed between each drip. The soaked cloth was then weighed on the scale to determine absorbance.

Example 1

Evaporation of water from a test fleece fabric that had a napped light reflecting plant supporting surface and an un-napped light absorbing base surface was tested and compared to the polar fleece control cloth disclosed in Harwood US Pat. Pub. No. 20140137471 which had two substantially napped surfaces that were both light reflective and had an appearance that was essentially white or off-white. The test fleece fabric was comprised of two webs that were joined together by a tie in yarn as illustrated in FIG. 4. The test fleece fabric was 100% polyester and had a napped side and an un-napped (flat jersey) side with a white guide yarn. The yarn content specifications were Drawn Textured Yarn (DTY) 1/70/34 SD black (see web 420), DTY 1/70/36 SD (see tie in yarn 430), and 2/75/72 SD (see web 440). The weight of the test fabric was 237 grams per meter squared ($g/m^2$). The light reflective surface had a pin brush finish to form the napped or fleece texture. The test fabric had a napped light reflecting plant supporting surface that appeared white or essentially white and an un-napped light absorbing base surface that appeared gray with white stripes from the guide yarn.

The test equipment included a 0 to 400 pound scale with data port that was positioned underneath a tray to measure changes in weight with time.

Air temperature, humidity and water temperature in the test apparatus were measured using sensors and data loggers to record the sensor outputs.

The tray measured approximately (1.5 meters×0.75 meters; 5 foot×2.5 foot) and was fitted with a test fabric or control fabric soilless growth medium for the tests. The test fabric and control fabrics were in a stretched configuration on the tray/flat; the test fabric draped over the outer edges of the tray and was absent scallops or gaps between the cloth and tray. A tray with the test or control fabric was placed on a pan that was interfaced with the scale. Fans and lights were installed on the test setup to simulate the evaporative environment in grow towers.

A 5 gallon reserve of water at room temperature (approximately 70 degrees Fahrenheit) was used to soak the test and control cloths.

Zero the scale and place the dry test medium on a tray and pan and into the Evaporation Testing set-up to obtain the dry weight.

Pour one gallon of room temperature water into a two-gallon bucket and then place the test medium into the bucket and submerge it into the water and soak for one minute. Record the temperature of the water in the bucket. Remove the test medium from the bucket and allow to it drip into the bucket then attach to the tray. Zero the scale and place the tray into the test set up and center the tray in the pan. The pan was interfaced with the scale to measure the weight change of the fabric as water evaporated from it. Turn on the scale, the temperature and humidity data logger, LED light rack and the fans. Record weight, temperature, and humidity readings every 1 minute. After one hour shut down the test.

The evaporation testing showed that the test fabric with knitted webs that was united by a yarn through binding loops or tie in loops and that had a napped light reflecting plant supporting surface facing up toward the lights and fans and an un-napped light absorbing base surface facing away from the lights and fans lost 11.1% less weight by evaporation than the control fabric of Harwood. The evaporation testing further showed that the same double knit fabric when tested with the un-napped light absorbing base surface facing up towards the lights and the light reflecting plant supporting surface was facing away from the light and fans lost 37.5% more weight by evaporation than the control fabric.

Without wishing to be bound by theory, when the fabric with joined knitted webs having a light absorbing surface was facing upward towards the fans and lights it resulted in greater evaporation compared to the control due to the darker color of the light absorbing layer and transfer of moisture from the napped side to the un-napped side. Conversely when the napped light reflecting plant supporting side was facing up towards the fans and lights, less evaporation occurred compared to the control because light was reflected from the upper surface and less water was retained and transferred from the un-napped light absorbing layer to the napped side of the fabric.

Less evaporation from the fabric is advantageous because it reduces water loss from the nutrient solution thereby improving nutrient solution composition and plant growing process stability. Less water loss also reduces equipment and operational costs associated with dosing equipment, sensors, and chemical analysis to maintain the nutrient solution concentration.

Example 2

Baby greens were grown on test fabric soilless growth media and control fabric soilless growth media similar to those used in Example 1. Eight (8) Flats of each of these test and control soilless growth media fabrics were seeded with the same amount of Arugula and were germinated to over 90%. After the same amount of time and conditions for plant development in a grow tower, the control fabric yielded an average of 2.2 pounds (1 kg) per flat for 8 test flats; the test flats with the fabric consisting of two joined webs having a light reflecting surface supporting the developing plants and a light absorbing base surface facing the nutrient nozzles and drip pan had an average yield of 2.03 lbs for 8 test flats. The results for the tests are summarized in Table 1.

TABLE 1

| Flat | Control Yield (lbs) | Fabric Yield (lbs) |
|---|---|---|
| 1 | 2.85 | 2.01 |
| 2 | 2.21 | 2.38 |
| 3 | 3.88 | 2.19 |
| 4 | 2.39 | 1.53 |
| 5 | 1.76 | 1.94 |
| 6 | 1.67 | 1.48 |
| 7 | 0.51 | 2.2 |
| 8 | 2.46 | 2.54 |
| AVG (lbs) | 2.22 | 2.03 |

The results show that the test fabric medium can be used to germinate and develop plants.

Example 3

A sample test fabric had one light absorbing side with a flat texture that appeared gray, or black, and included spaced white stripes. The test fabric had a second light reflecting side that appeared white, or off-white, and had a napped polyester texture. The test fabric was similar to that used Example 1. The test fabric was evaluated for wicking and water absorbance as described in Harwood U.S. Pat. Pub. No. 20140137471, the contents of which are incorporated herein by reference in their entirety.
1. Tub filled with distilled water and red food coloring.
2. Cloth strip set adjacent to ruler to measure the height of wicking.
3. Cloth sample (1"×3.5"; 22.58 cm$^2$) for soaking to assess absorbance.
4. A scale±0.1 grams was used to weigh wet and dry samples.

Wicking—The test fabric at 3 minutes had wicked to 2 and ⅝ inches (6.66 centimeters) above the water surface and 3⅜" (8.57 cm) by 6 minutes.

Water Absorbance—The test fabric held 5.3 grams of water when time between drops reached 5 seconds. No evidence of air entrapment was observed. The cloth drip pattern when removed from the tub of water was initially a stream of water followed by 3-5 drops and then no more drops. The water absorption in grams per square centimeter was 5.3 g/22.25 cm$^2$=0.23 g/cm$^2$.

The polar fleece materials reported by Harwood (see Tables 1 and 2 of U.S. Pat. Pub. No. 20140137471) had wicking heights of between 2.5 cm and 5.5 cm and water absorbances of between 0.22 g/cm$^2$ and 0.32 g/cm$^2$. Visually, both sides of these materials appeared to be substantially the same.

The results of this example show that the test fabric which had a light reflecting surface and a light absorbing surface had a wicking height of 6.6 cm and water absorbance of 0.23 g/cm$^2$.

Example 4

This example compares the curling of a material under stretching (taut) conditions similar to those experienced by a fabric that is secured to a tray in a stretched configuration. A stretched material helps provide a substantially flat plant developing surface with no sags that would cause puddling of nutrient solution, seeds, or seedlings, and no scallops or curls that allow passage of nutrient solution along sides of the frame to developing plants. The control fabric was a polar fleece material as disclosed in Harwood WO2014081663 with two substantially napped surfaces that were both light reflective and essentially off white or yellow in appearance. The test fabric was made from two webs joined together, one web had a napped light reflecting plant supporting surface that appeared white or off-white and the second web had an un-napped light absorbing base surface that included a yarn that appeared black.

The control fabric and test fabric samples were stretched by firmly elongating the material on a flat surface with a force similar to that experienced by a grommeted fabric attached to a tray in a stretched configuration. The force was less than that which would tear the fabric or cloth but was sufficiently high that the fabric elongated less than 5% with further application of force. Fabrics were tested on a side such that if a curl resulted from the stretching force, the fabric curled upward (see for example FIG. 8B).

Figure 8A:
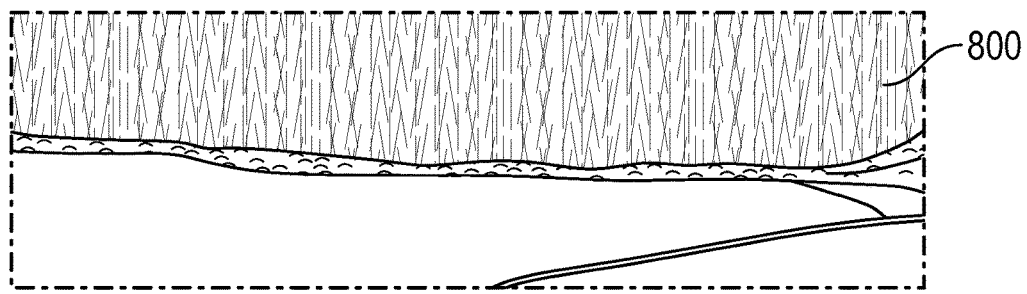
FIG. 8 (A-B) show a cloth napped on both surfaces in (A) an un-stretched state, and (B) a stretched state in a first cloth direction.
FIG. 8B shows the cloth stretched in the first direction and the edge curling as described in Example 4.
Figure 8B:
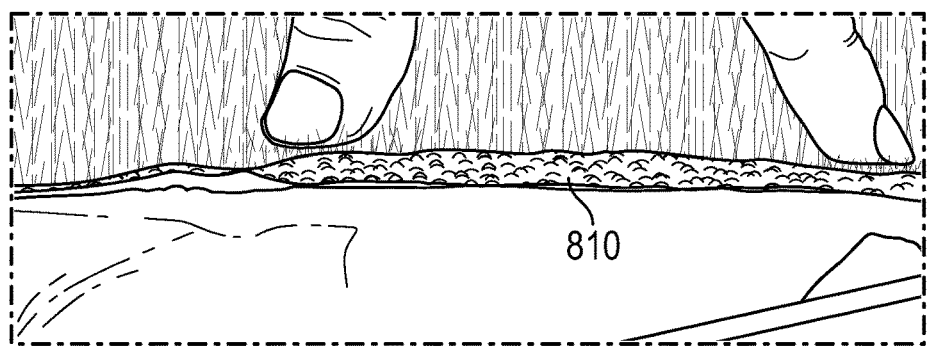

FIG. 8 (A-B) shows a cloth 800 napped on both surfaces in (A) an un-stretched state and (B) a stretched state in a first cloth direction. FIG. 8B shows the cloth 800 stretched in the first direction. In the stretched state in the first direction a curl 810 forms. The height of the curl is about 2-3 times the thickness of the fabric in FIG. 8 (A).

Figure 9A:
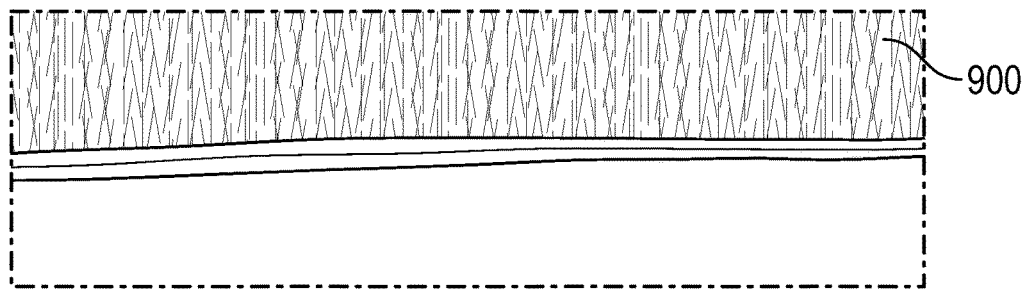
FIG. 9 (A-B) shows the cloth of FIG. 8 (A-B) in (A) an un-stretched state and (B) a stretched state in a second cloth direction (perpendicular to the first direction).
FIG. 9B shows the cloth stretched in the second direction and the edge curling as described in Example 4.
Figure 9B:
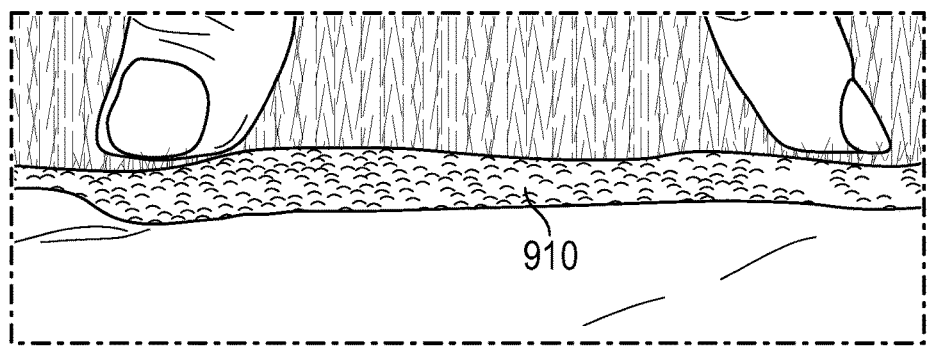

FIG. 9 (A-B) shows the cloth 900 of FIG. 8 (A-B) in (A) an un-stretched state and (B) a stretched state in a second cloth direction (transvers to the first direction). FIG. 9B shows the cloth 900 stretched in the second direction. In the stretched state in the second direction a curl 910 forms. The height of the curl is about 2-3 times the thickness of the fabric in FIG. 9 (A).

Figure 10A:
FIG. 10 (A-B) shows a soilless growth medium that is a fabric in an embodiment of the disclosure that is napped on one surface and flat on the opposite surface in (A) an un-stretched state and (B) a stretched state in a first fabric direction.
FIG. 10B shows the soilless growth medium fabric stretched in the first direction (essentially no edge curling) as described in Example 4.
Figure 10B:
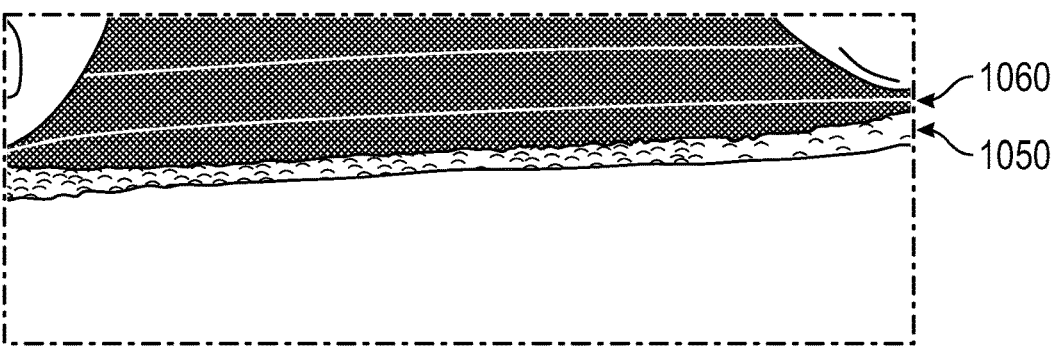

FIG. 10 (A-B) shows the test fabric napped on one surface 1050 (bottom) and that has an un-napped or flat texture on the opposite top surface 1060 in an un-stretched state (A), and a stretched state (B) in a first fabric direction. FIG. 10B shows the fabric stretched in the first direction. Essentially no edge curling was observed for the fabric under these conditions.

Figure 11A:
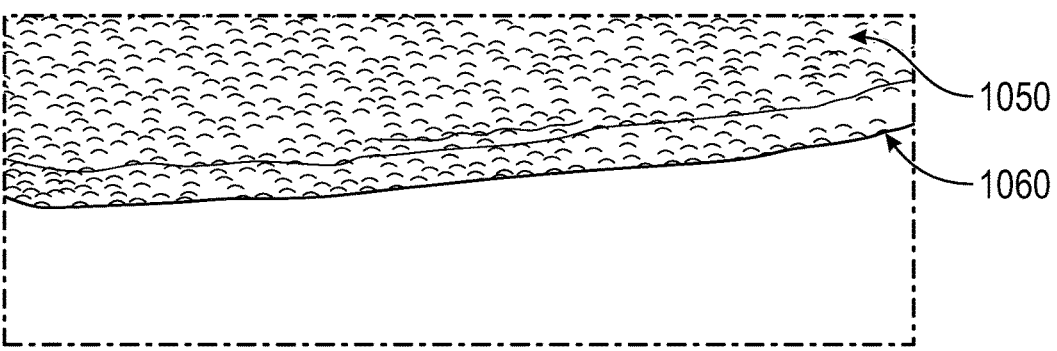
FIG. 11 (A-B) shows the soilless growth medium fabric napped on one surface and flat on the opposite surface (the soilless growth medium fabric is flipped from the orientation shown in FIG. 10 (A-B)) in (A) an un-stretched state, and (B) in a stretched state in the first direction (same direction as FIG. 10B).
FIG. 11B shows the fabric stretched in the first direction (essentially no edge curling) as described in Example 4.
Figure 11B:
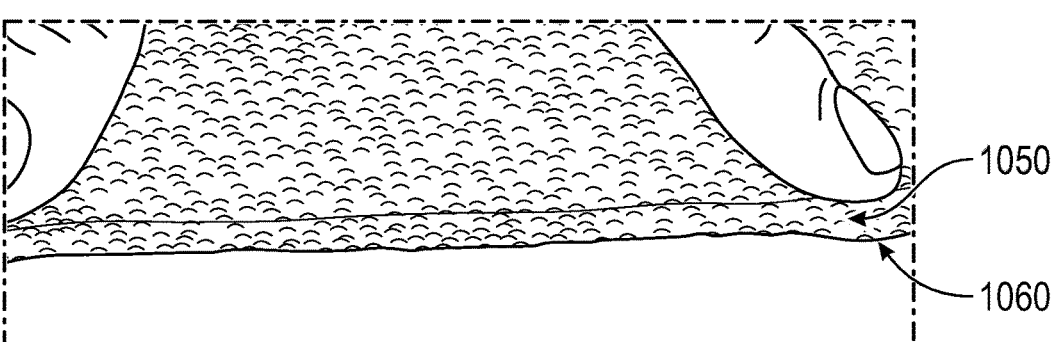

FIG. 11 (A-B) shows the test fabric napped on top surface 1050 and that has an un-napped or flat texture on the opposite surface 1060 (the test fabric is flipped from that shown in FIG. 10 (A-B)) in (A) an un-stretched state and (B) in a stretched state in the first direction (same direction as FIG. 10B). FIG. 11B shows the fabric stretched in the first direction with the napped side facing up. Essentially no edge curling was observed for the fabric under these conditions.

Figure 12A:
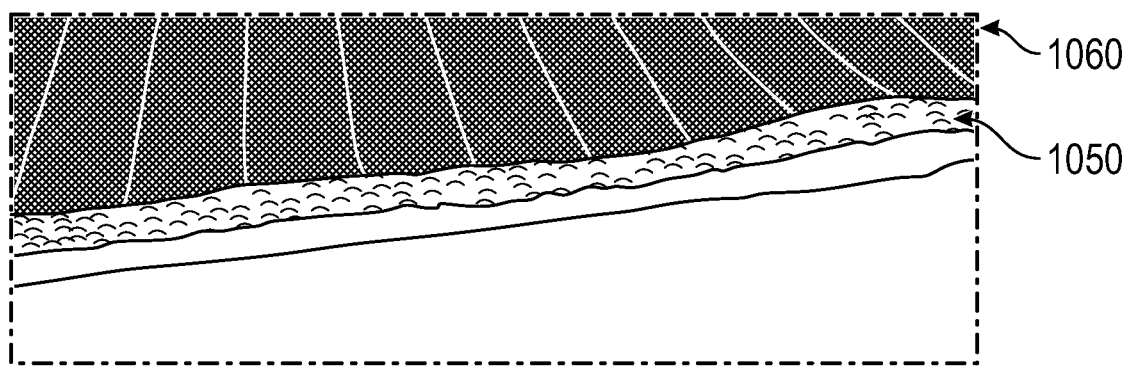
FIG. 12 (A-B) shows the soilless growth medium fabric napped on one surface and flat on the opposite surface in (A) an un-stretched state and (B) a stretched state in a second soilless growth medium fabric direction (note the direction of the white stripes compared to FIG. 10A).
FIG. 12B shows the soilless growth medium fabric stretched in the second direction (essentially no edge curling) as described in Example 4.
Figure 12B:
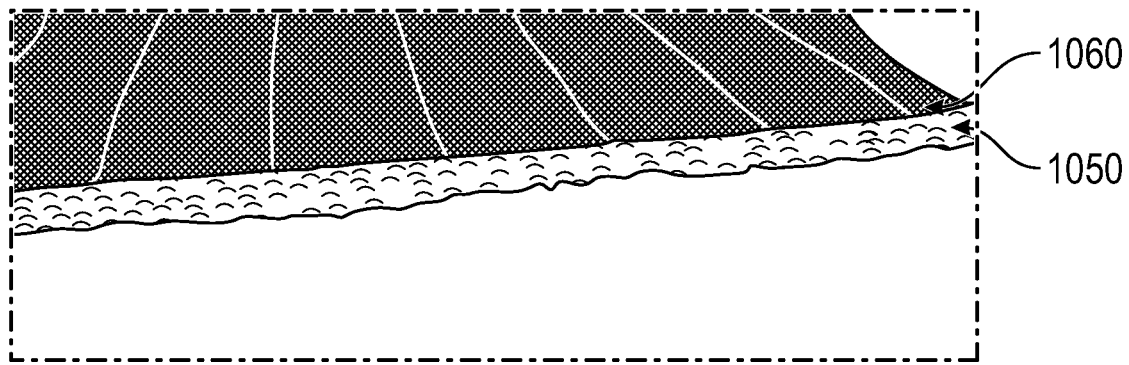

FIG. 12 (A-B) shows the test fabric napped on one surface (1050) and has an un-napped or flat texture on the opposite surface (1060) in an un-stretched state (A) and a stretched state (B) in a second fabric direction. FIG. 12B shows the fabric stretched in the second direction. Essentially no edge curling was observed for the fabric with the light absorbing web surface facing up.

The results of the test show that compared to the cloth that is napped on both surfaces in FIG. 8 (A-B), the fabric with balanced structure made from two webs in FIG. 10 (A-B) resisted or showed no curling at its edges under stretching conditions similar to those experienced when the fabric is attached onto a tray.

Example 5

This example illustrates the difference in the amount of light absorbed and not transmitted through a root permeable substrate with a light reflecting upper plant supporting surface and an opposing lower light absorbing base surface when compared to a root permeable substrate with a light reflecting upper plant supporting surface and an opposing lower light reflecting base surface.

FIG. 13 A illustrates a portion of a growth chamber showing indoor growing flats with two different soilless growth media. The indoor farming flats are positioned over the drip pan 1320 of the growth chamber. Soilless growth media 1310 and 1330 are the same (prior art cloth) and had a light reflecting upper surface and an opposing light reflecting lower surface (see FIG. 7, Flat B). Growth medium 1340 had a light reflecting upper surface 1342 and a light absorbing lower surface 1346. Flats with growth media 1330 and 1340 are also shown in FIGS. 6A-B and FIG. 7. In FIG. 6A, Flat A corresponds to the flat with growth medium 1340 in FIG. 13A. In FIG. 6A, Flat B corresponds to the flat with growth medium 1330 in FIG. 13A. The soilless growth media 1330 and 1340 were supported by frames or trays to form flats. For example, rectangular frame or tray 1324 was used to support growth medium 1340 to form a flat. The flats were positioned overtop of a nutrient supply sprayer (not shown) and a drip pan 1320. In FIG. 13A, a side of the flat including the frame 1324 and growth medium 1340 was lifted above the edge of the drip pan 1320; flats with growth media 1310 and 1330 remained on the drip pan ledge. Lighting (not shown) was provided to the upper surface of the growth media 1310, 1330, and 1340, and a nutrient solution was supplied to the underside of the growth media to develop the plants.

All growth media 1310, 1330, and 1340 had seedlings developing on the plant supporting surfaces of the growth media, shown in FIG. 13A by 1314 and 1354 respectively; seedlings are shown on growth media 1330 and 1340 in FIGS. 6A and 6B. Roots 1348 penetrated the root permeable substrate 1340; roots also penetrated the substrates 1310 and 1330 (not shown in FIG. 13 (A-B)).

Growth medium 1340 was a root permeable substrate that supported the germination and development of plants 1354. The root permeable substrate had a light reflecting plant supporting surface 1342 and an opposing light absorbing base surface 1346. Light reflecting plant supporting surface 1342 is shown with good drape over an edge of the rectangular frame or tray 1324 in FIG. 13A. An optional lighter colored tracer material, illustrated by the light colored yarn material line(s) 1344 in FIG. 13A-B between the darker light absorbing surface 1346 regions of the growth medium 1340, was incorporated into the soilless growth medium for ease in non-bias width cutting. Plant supporting surface 1342 was rough and had a napped, and in particular an upwardly directed nap texture. Lower surface 1346 had a relatively flat texture and was not napped as shown in FIG. 13 A and also in FIG. 7 (Flat A). Plant supporting surfaces for growth media 1310 and 1330 had an outwardly directed nap on both the upper and lower surfaces as shown in FIG. 7 (Flat B corresponded to 1330).

The root permeable soilless growth medium substrate 1340 was positioned atop the support 1324. The support had a root side which faced the drip pan surface region 1322(a) and a developing plant side 1342 which faced the grow lights positioned above the substrate. The soilless growth medium substrate 1340 was positioned atop the support 1324 with the light reflecting plant supporting surface 1342 of the substrate and the developing plant facing side of the support facing in the same direction; the light absorbing base surface 1346 of the substrate and the root side of the support face the same direction (towards the drip pan) when the substrate was positioned atop the support.

The inner drip pan surface in FIG. 13 A-B shows that it reflected light illuminating the flats that was not absorbed by the developing plants or by the different growth media 1310, 1330, and 1340. For example, the drip pan surfaces indicated by regions 1316 and 1318 both appear light colored, almost white, which indicated that light passed through the growth media 1310 and 1330, was not absorbed, and was transmitted to and reflected by the drip pan inner surface at regions 1316 and 1318. In contrast, the drip pan surface indicated by region 1322(a) and 1322(b), which was below growth media 1340, was very dark and almost black. This dark reflection from the drip pan surface illustrated that more light was absorbed by growth media 1340, especially by lower surface regions like 1346, than for either growth media 1310 or 1330.

FIG. 13 B is a more detailed view of some of the inner drip pan surfaces shown in FIG. 13 A. In FIG. 13 B, the drip pan surface region indicated by reference number 1322(a) appeared substantially darker than drip pan surface region 1316 which indicated that more light was absorbed by the light growth media 1340 with a light absorbing bottom surface 1346 than the amount of light that was absorbed by the growth media 1330 without the light absorbing bottom surface. In FIG. 13B, the optional lighter colored material 1344 incorporated into the growth medium 1340 appears lighter because it absorbs less (transmits more) light than the adjacent darker light absorbing lower surface regions 1346 of the growth medium 1340. That less light was absorbed by the tracer region material was also evidenced by the reflection of the transmitted or non-absorbed light from the tracer region at for example 1360 and 1362 reflected on the drip pan surface as shown in FIG. 13 B.

This example illustrates that a root penetrable soilless growth medium with a light reflecting upper plant supporting surface and a light absorbing base surface can support the germination and development of plants. Such a soilless growth medium absorbs incident light that is not utilized by the developing plants and reduces the amount of light that reaches the drip pan or other nutrient container surfaces used in aeroponic or hydroponic growing chambers. Reducing the amount of light that reaches these nutrient container surfaces can inhibit the growth of algae underneath the growth medium or on underlying drip pan surfaces.

The following clauses define particular aspects and embodiments of the disclosure.

Clause 1. An indoor farming flat comprising: a soilless growth medium comprising a fabric having a first web that has a light reflecting plant supporting surface and a second web that has a light absorbing base surface, the fabric attached along peripheral areas to a tray, the tray has a root side and a developing plant side, the fabric attached to the tray with the light reflecting plant supporting surface of the fabric and the developing plant facing side of the tray facing in the same direction when the fabric is attached to the tray and the light absorbing base surface of the fabric and the tray root side of the fabric face the same direction when the fabric is attached to the tray;

the light reflecting plant supporting surface has a napped texture and comprises a yarn that reflects more light than the light absorbing base surface and the light absorbing base surface has a non-napped texture and comprises a yarn that absorbs more than the light reflecting surface.

Clause 2. The indoor farming flat of clause 1, wherein the fabric is a double knit fabric comprising a tie-in yarn linking the first web having the light reflecting plant supporting surface and the second web having the light absorbing base surface.

Clause 3. The indoor farming flat as in any one of the preceding clauses wherein the fabric is in a stretched configuration on the tray, said fabric overlies the outer edges of the tray and is absent scallops or gaps between the cloth and tray.

Clause 4. The indoor farming flat as in any one of the preceding clauses wherein the fabric further comprises a running stitch that has ends fixed to one or more edge regions of the fabric, the running stitch has a light reflecting color.

Clause 5. The indoor farming flat as in any one of the preceding clauses wherein the fabric attached to the tray overhangs the outer edges of the tray with good drape.

Clause 6. The indoor farming flat as in any one of the preceding claims wherein the fabric attached to the tray is a balanced fabric and uncurled at the edge regions of the tray.

Clause 7. A growth chamber comprising the flat of claim 1, said flat positioned overtop of a nutrient supply source and a drip pan underlying the light absorbing base surface of the fabric and the nutrient supply source, said drip pan comprising a light absorbing material.

Clause 8. A method of indoor farming comprising: providing light of wavelengths suitable for developing plants to a soilless growth medium comprising: one or more developing plants, a fabric soilless growth medium having a first web that has a light reflecting plant supporting surface and a second web that has a light absorbing base surface, the light provided to the light reflecting plant supporting surface of the fabric soilless growth medium, the fabric attached along peripheral areas to a tray, the tray has a root side and a developing plant side, the fabric attached to the tray with the light reflecting plant supporting surface of the fabric and the developing plant side of the tray facing in the same direction when the fabric is attached to the tray and the light absorbing base surface of the fabric and the tray root side facing the same direction when the fabric is attached to the tray; the light reflecting plant supporting surface has a napped texture and comprises a yarn that has a color that reflects more light suitable for developing plants than the light absorbing surface and the light absorbing base surface has a flat texture and comprises a yarn that has a color that absorbs more light suitable for developing plants than the light reflecting surface.

Clause 9. The method of indoor farming of clause 8 further comprising: providing a nutrient solution to roots protruding through the light absorbing base surface of the fabric.

Clause 10. The method of indoor farming as in any one of clauses 8, or 9 further comprising: providing a spray of nutrient solution to roots protruding through the light absorbing base surface of the fabric.

Clause 11. The method of indoor farming as in any one of clauses 8, 9, or 10 wherein the fabric is a double knit fabric with a tie-in yarn linking the plant supporting surface first web and the light absorbing base second web together in the fabric.

Clause 12. The method of indoor farming as in any one of clauses 8, 9, 10, or 11 wherein the fabric attached to the tray is in a stretched configuration and overhangs the outer edges of the tray with good drape.

Clause 13. The method of indoor farming as in any one of clauses 8, 9, 10, 11, or 12 wherein the fabric further comprises a running stitch, said running stitch has ends fixed to one or more edge regions of the fabric, the running stitch comprises a material that reflects light.

Clause 14. A method of making a flat comprising: attaching a replaceable soilless growth medium on a tray, said soilless growth medium comprising a fabric having a first web that has a light reflecting plant supporting surface and a second web that has a light absorbing base surface, said tray has a root facing side and a developing plant facing side, the fabric attached to the tray with the light reflecting plant supporting surface of the fabric and the developing plant facing side of the tray facing in the same direction when the fabric is attached to the tray and the light absorbing base surface of the fabric and the tray root side facing the same direction when the fabric is attached to the tray.

Clause 15. The method of clause 14 further comprising positioning the fabric on the tray in a stretched configuration, said fabric overhangs the outer edges of the tray with good drape.

Clause 16. The method of clause 14, or 15 wherein the fabric comprises one or more running stitches fixed to one or more attachment points on perimeter edges of the fabric.

Clause 17. A method of maintaining a nutrient solution concentration in a growth chamber comprising a soilless growth medium that has a light reflecting plant supporting surface with developing plants thereon and a light absorbing base surface with roots extending therethrough; the method comprising:

applying a nutrient solution onto the light absorbing base surface and roots of developing plants, said nutrient solution provided a nutrient source positioned below the light absorbing base surface of the fabric, the soilless growth medium positioned atop the tray with good drape over the outer edges of the tray and is absent scallops or gaps between the fabric and tray; and, providing light suitable for developing plants to the developing plants, reflecting a portion of the light from the light reflecting plant supporting surface, and absorbing a portion of the light by the light absorbing base surface.

Clause 18. The method of clause 17 wherein the soilless growth medium is a fabric, said fabric in a stretched configuration that overhangs the outer edges of the tray with good drape.

Clause 19. The method as in any one of clauses 17, or 18 wherein the light reflecting plant supporting surface has a rough texture.

Clause 20. The method as in any one of clauses 17, 18, or 19 further comprising providing an airflow across the light reflecting plant supporting surface.

Clause 21. The method as in any one of clauses 17, 18, 19, or 20 wherein applying the nutrient solution comprising spraying.

Clause 22. An article comprising:

a root permeable substrate that supports the germination and development of plants, said root permeable substrate has a light reflecting plant supporting surface and an opposing light absorbing base surface, the root permeable substrate positioned atop a support, the support has a root side and a developing plant side, the substrate positioned atop the support with the light reflecting plant supporting surface of the substrate and the developing plant facing side of the support facing in the same direction; the light absorbing base surface of the substrate and the root side of the support face the same direction when the substrate is positioned atop the support;

the light reflecting plant supporting surface of the substrate reflects more light than the light absorbing base surface.

Clause 23. The article of clause 22 wherein the light reflecting plant supporting surface of the substrate has a rough texture.

Clause 24. The article as in any one of clauses 22-23 wherein the light absorbing base surface has a flat texture Clause 25. The article as in any one of clauses 22-24 wherein the soilless growth medium is a cloth or fabric.

Clause 26. The article as in any one of clauses 23-25 wherein the rough texture comprises a nap or an upwardly directed nap.

Clause 27. The article as in any one of clauses 22-26 further comprising developing plants atop light reflecting plant supporting surface.

Clause 27. A growth chamber comprising the article of clause 22, said flat positioned overtop of a nutrient supply source, a drip pan underlying the light absorbing base surface of the soilless growth medium and the nutrient supply source, said drip pan comprising a light absorbing material.

Advantageously embodiments of the disclosure provide a soilless growth medium that can be positioned on a tray, used to germinate and develop plants and minimize water loss from the nutrient solution used in the growth chamber(s) thereby improving process stability. Less water loss from nutrient solution reduces equipment and operational costs associated with dosing equipment, chemical sensors, and chemical analysis to maintain the nutrient solution concentration in growth chambers and also reduces equipment costs and energy usage in order to maintain humidity levels in an indoor farm.

Approximating language, as used herein throughout the specification and claims, may be applied to modify any quantitative or qualitative representation that could permissibly vary without resulting in a change in the basic function to which it is related. Accordingly, a value modified by a term such as "about" or numerical ranges is not to be limited to a specified precise value, and may include values that differ from the specified value. In at least some instances, the approximating language may correspond to the precision of an instrument for measuring the value.

It will be apparent to those skilled in the art that various modifications and variations can be made in the method and system of the present disclosure without departing from the spirit or scope of the disclosure. Thus, it is intended that the present disclosure include modifications and variations that are within the scope of the appended claims and their equivalents.

The invention claimed is:

1. An indoor farming flat, comprising:
a root penetrable soilless growth medium comprising a fabric having a first web that is a light reflecting plant supporting surface and a second web that is a light absorbing base surface, the fabric is a balanced double-knit fabric comprising a tie-in yarn continuously linking the first web having the light reflecting plant supporting surface and the second web having the light absorbing base surface;
the balanced double-knit fabric attached along peripheral areas to a tray, the tray has a root side and a developing plant side;
the balanced double-knit fabric attached to the tray with the light reflecting plant supporting surface of the balanced double-knit fabric and the developing plant facing side of the tray facing in the same direction when the balanced double-knit fabric is attached to the tray and the light absorbing base surface of the balanced double-knit fabric and the root side of the tray and the balanced double-knit fabric face the same direction when the balanced double-knit fabric is attached to the tray, the balanced double-knit fabric is in a stretched configuration on the tray, the balanced double-knit fabric in the stretched configuration drapes the outer edges of the tray to a thickness of the tray and is absent scallops or gaps between the balanced double-knit fabric and the outer edges of the tray;
the light reflecting plant supporting surface has a napped texture and comprises a yarn that reflects more light than the light absorbing surface and the light absorbing base surface has a non-napped texture and comprises a yarn that absorbs more light than the light reflecting surface.

2. The indoor farming flat of claim 1, wherein the balanced double-knit fabric further comprises two or more running stitches, each of the running stiches has ends fixed to one or more edge regions of the balanced double-knit fabric, each of the running stitches reflects light, each of the running stiches formed by passing a yarn or thread in and out of the webs of the balanced double-knit fabric, each of the running stitches having ends fixed to one or more edge regions of the balanced double-knit fabric, the end of each of the running stitches held by a fixture.

3. The indoor farming flat of claim 2, wherein the balanced double-knit fabric has two or more evenly spaced running stitches.

4. A method of indoor farming, comprising:
providing light suitable for developing plants to a root penetrable soilless growth medium comprising developing plants and a fabric having a first web that is a light reflecting plant supporting surface and a second web that is a light absorbing base surface, the fabric is a balanced double-knit fabric comprising a tie-in yarn continuously linking the first web having the light reflecting plant supporting surface and the second web having the light absorbing base surface, the light provided to the light reflecting plant supporting surface of the root penetrable soilless growth medium, the balanced double-knit fabric attached along peripheral areas to a tray, the tray has a root side and a developing plant side, the balanced double-knit fabric attached to the tray with the light reflecting plant supporting surface of the balanced double-knit fabric and the developing plant side of the tray facing in the same direction when the balanced double-knit fabric is attached to the tray and the light absorbing base surface of the balanced double-knit fabric and the root side of the tray and the balanced double-knit fabric facing the same direction when the balanced double-knit fabric is attached to the tray, the balanced double-knit fabric is in a stretched configuration on the tray, the balanced double-knit fabric in the stretched configuration drapes the outer edges of the tray to a thickness of the tray and is absent scallops or gaps between the balanced double-knit fabric and the outer edges of the tray;
the light reflecting plant supporting surface has a rough texture and comprises a material that reflects more light of wavelength suitable for developing plants than the light absorbing base surface and the light absorbing base surface has a flat texture and comprises a material that absorbs more light of wavelength suitable for developing plants than the light reflecting surface.

5. The method of indoor farming of claim 4, further comprising: providing a nutrient solution to roots of the plants protruding through the light absorbing base surface of the balanced double-knit fabric.

6. The method of claim 5, wherein the balanced double-knit fabric further comprises two or more running stitches, each of the running stitches has ends fixed to one or more edge regions of the balanced double-knit fabric, each of the running stitches reflects light, each of the running stitches formed by passing a yarn or thread in and out of the webs of the balanced double-knit fabric, each of the running stitches having ends fixed to one or more edge regions of the balanced double-knit fabric, the end of each of the running stitches held by a fixture.

* * * * *